(12) United States Patent
Ishizaka

(10) Patent No.: US 8,612,943 B2
(45) Date of Patent: Dec. 17, 2013

(54) DATA TRANSMISSION PROGRAM, DATA TRANSMISSION APPARATUS, AND METHOD FOR EDITING OPERATION MANUAL

(75) Inventor: Hanae Ishizaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 511 days.

(21) Appl. No.: 12/858,115

(22) Filed: Aug. 17, 2010

(65) Prior Publication Data

US 2011/0047468 A1    Feb. 24, 2011

(30) Foreign Application Priority Data

Aug. 20, 2009   (JP) ................................ 2009-190952

(51) Int. Cl.
*G06F 9/44*   (2006.01)

(52) U.S. Cl.
USPC ........................................................ 717/134

(58) Field of Classification Search
USPC ........................................ 717/134, 135, 138
See application file for complete search history.

(56) References Cited

U.S. PATENT DOCUMENTS

| | | | |
|---|---|---|---|
| 7,079,906 B2 * | 7/2006 | Rapp, III ........................... | 700/96 |
| 7,685,527 B2 * | 3/2010 | Yan et al. ........................ | 715/762 |
| 7,785,755 B2 * | 8/2010 | Yamada ............................ | 430/30 |
| 7,966,246 B2 * | 6/2011 | Ingargiola et al. ............... | 705/37 |
| 8,332,193 B2 * | 12/2012 | Mckim et al. ...................... | 703/6 |
| 2005/0090911 A1 * | 4/2005 | Ingargiola et al. .............. | 700/36 |
| 2005/0240920 A1 * | 10/2005 | Yoshimura et al. ............ | 717/174 |
| 2006/0026570 A1 * | 2/2006 | Chan et al. ....................... | 717/127 |
| 2007/0107057 A1 * | 5/2007 | Chander et al. ................. | 726/22 |
| 2007/0166633 A1 * | 7/2007 | Yamada ............................ | 430/30 |
| 2007/0240046 A1 * | 10/2007 | Yan et al. ........................ | 715/700 |
| 2009/0144398 A1 * | 6/2009 | Reisman .......................... | 709/219 |
| 2009/0292514 A1 * | 11/2009 | McKim et al. ..................... | 703/6 |

FOREIGN PATENT DOCUMENTS

| | | | |
|---|---|---|---|
| JP | 6-131215 A | | 5/1994 |
| JP | 10-340173 A | | 12/1998 |
| JP | 11-212793 A | | 8/1999 |
| JP | 2000-354263 A | | 12/2000 |
| JP | 2006-11575 A | | 1/2006 |

OTHER PUBLICATIONS

Japanese Office Action mailed Jan. 8, 2013 for corresponding Japanese Application No. 2009-190952, with Partial English-language Translation.
Japanese Office Action mailed Oct. 15, 2013 for corresponding Japanese Application No. 2009-190952, with partial English-language translation.

* cited by examiner

*Primary Examiner* — Anna Deng
(74) *Attorney, Agent, or Firm* — Fujitsu Patent Center

(57) ABSTRACT

A data transmission program, stored in a computer-readable recording medium, causing a computer to function as a transmission-request receiving unit configured to receive an editing-program transmission request from a second information processing apparatus displaying an operation manual that includes a procedure for remotely controlling a first information processing apparatus on a display device, the editing-program transmission request being transmitted from the second information processing apparatus, and a program transmitting unit configured to transmit, once the transmission-request receiving unit receives the editing-program transmission request, an operation-manual editing program for editing the operation manual to the second information processing apparatus, the program transmitting unit also transmitting an emulation program for causing the display device to display a control screen used at the time of remote controlling of the first information processing apparatus to the second information processing apparatus.

9 Claims, 20 Drawing Sheets

|  | MODEL A | MODEL B | MODEL C |
|---|---|---|---|
| CPU | 0-3 | 0-2 | 0 |
| MEMORY | 0-2 | 0-1 | 0 |
| I/O | 0-1 | 0-1 | 0 |
| DOMAIN | 0-1 | 0-1 | 0 |
| ⋮ | ⋮ | ⋮ | ⋮ |

|  | MODEL A | MODEL B | MODEL C |
|---|---|---|---|
| SELECTION FLAG | 1 | 0 | 0 |
| USER NAME | user001 | ... | ... |
| USER ID | 101 | ... | ... |
| NETWORK ADDRESS | 10.12.xx.xx | ... | ... |
| CPU | 0-2 | 0-1 | 0 |
| DOMAIN | 0-1 | 0-1 | 0 |
| ⋮ | ⋮ | ⋮ | ⋮ |

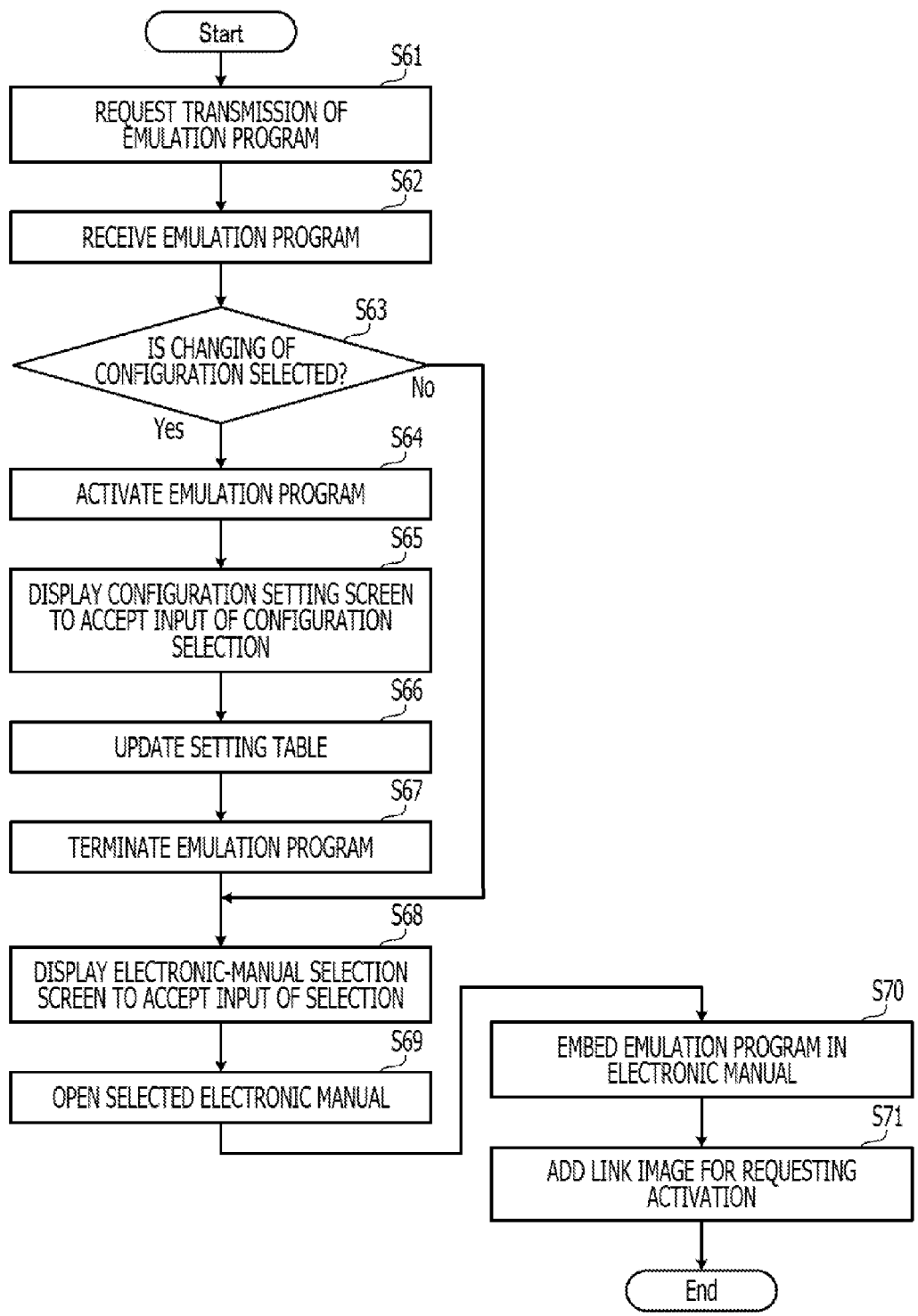

DATA TRANSMISSION PROGRAM, DATA TRANSMISSION APPARATUS, AND METHOD FOR EDITING OPERATION MANUAL

CROSS-REFERENCE TO RELATED APPLICATION

This application is based upon and claims the benefit of priority of the prior Japanese Patent Application No. 2009-190952, filed on Aug. 20, 2009, the entire contents of which are incorporated herein by reference.

FIELD

The embodiments discussed herein relate to a data transmission program, a data transmission apparatus, and a method for editing an operation manual.

BACKGROUND

Recently, operation manuals that include operation procedures of various information processing apparatuses have been increasingly supplied to users as electronic data, such as electronic files, via networks, such as from web sites. The manuals may be acquired by users considering purchasing the information processing apparatuses as well as those having purchased the information processing apparatuses. When the manuals are supplied as electronic data, the users considering purchasing the information processing apparatuses can acquire the electronic data more easily than when the manuals are supplied in a printed form. Allowing users to acquire the manuals more easily, advantageously brings acceleration of sales of the information processing apparatuses to dealers of the information processing apparatuses.

Some information processing apparatuses operate in accordance with control operations performed by users in external apparatuses. Additionally, emulation programs emulating operations of such information processing apparatuses may be supplied to users. Even if users' terminal devices are not connected to the information processing apparatuses, the users can simulatively experience operations for controlling the information processing apparatuses by having the terminal devices execute the emulation programs.

A telephone exchange debugging system is one example of technique for simulating operations of electronic devices. The telephone exchange debugging system sends pseudo call data to an actual telephone exchange in accordance with a test procedure specification, thereby simulatively testing whether an error occurs in operations of the telephone exchange after an environmental change.

A method for generating input/output stubs on the basis of a hardware interface specification, a software specification, and an input/output-stub-command generation rule is one example of technique for generating input/output stubs simulating linked operations of hardware and software.

Related arts are disclosed in Japanese Laid-open Patent Publication No. 2000-354263 and Japanese Laid-open Patent Publication No. 6-131215.

Information processing apparatuses, such as server, that operate in accordance with user operations performed in external apparatuses tend to have complicated operation procedures. In such a case, users unfortunately have difficulty understanding the operation procedures of the information processing apparatuses with reference to manuals that include the operation procedures of the information processing apparatuses.

In contrast, utilization of emulation programs emulating the operation procedures of the information processing apparatuses allow the users to easily understand the operation procedures of the information processing apparatuses. However, creating emulation programs for information processing apparatuses having complicated operation procedures unfortunately involves a vast amount of work and a high cost.

SUMMARY

According to an aspect of the embodiments, there is provided a computer-readable recording medium storing a data transmission program, the data transmission program causing a computer to execute a process that includes receiving an editing-program transmission request from a second information processing apparatus displaying an operation manual that includes a procedure for remotely controlling a first information processing apparatus on a display device, the editing-program transmission request being transmitted from the second information processing apparatus in response to a user operation on a program-transmission requesting image displayed within the displayed image of the operation manual, and transmitting an operation-manual editing program for editing the operation manual and an emulation program for configuring the display device to display a control screen for remotely controlling the first information processing apparatus to the second information processing apparatus, when the computer receives the editing-program transmission request, wherein the operation-manual editing program causing the second information processing apparatus to display a program activation image for activating the emulation program in response to a user operation into the displayed operation manual.

It is to be understood that both the foregoing general description and the following detailed description are exemplary and explanatory and are not restrictive of the various embodiments, as claimed.

BRIEF DESCRIPTION OF DRAWINGS

FIG. 12 illustrates an example of information held in a system configuration table.

FIG. 13 illustrates an example of information held in a setting table.

FIG. 20 is a flowchart illustrating a procedure for updating an emulation program embedded in an electronic manual.

DESCRIPTION OF EMBODIMENTS

Embodiments will be described in detail below with reference to the accompanying drawings.

Figure 1:
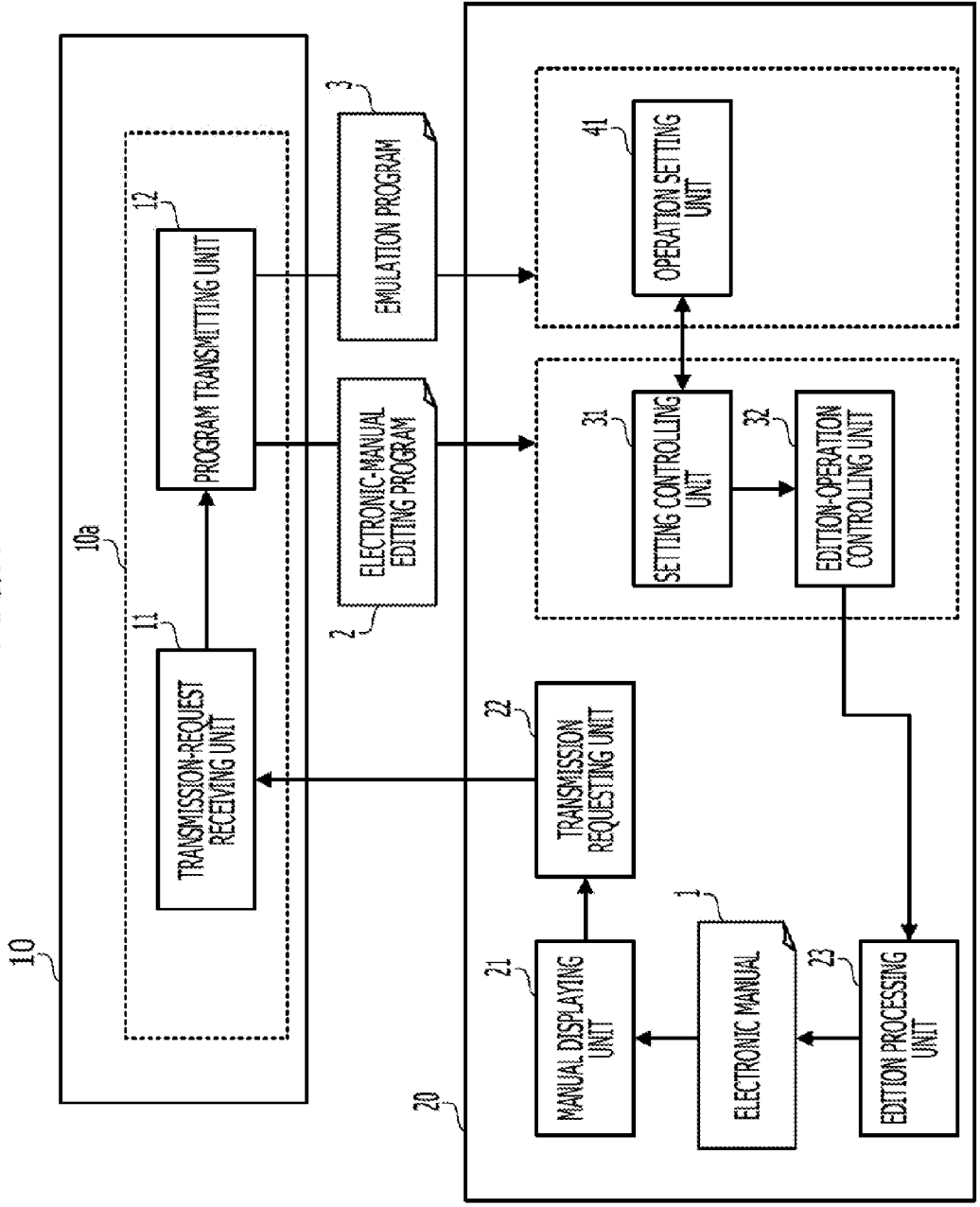
FIG. 1 illustrates a configuration of a data transmission system according to a first embodiment.

FIG. 1 is a diagram illustrating a configuration of a data transmission system according to a first embodiment.

The data transmission system illustrated in FIG. 1 may include a download server 10 and a user terminal 20. The download server 10 and the user terminal 20 are information processing apparatuses, such as computers, and connected to each other via a network not illustrated.

The download server 10 may include a transmission-request receiving unit 11 for receiving a transmission request from the user terminal 20 and a program transmitting unit 12 for transmitting a predetermined program to the user terminal 20. The transmission-request receiving unit 11 and the program transmitting unit 12 are functions implemented by, for example, a central processing unit (CPU) of the download server 10 executing a data transmission program 10a.

The program transmitting unit 12 transmits, to the user terminal 20, an emulation program 3 and an electronic-manual editing program 2 for editing an electronic manual 1 serving as an operation manual. In this embodiment, the electronic manual 1 includes a procedure for remotely controlling an information processing apparatus from an external apparatus. The emulation program 3 allows users to simulatively experience a remote control operation by causing a display device to display a virtual control screen used at the time of remote controlling of the information processing apparatus.

For example, a control screen for accepting input of a control command is displayed on the display device of the user terminal 20 in response to execution of the emulation program 3 in the user terminal 20. In response to input of a control command through a user input operation, response information for the input control command from a remotely controlled information processing apparatus, for example, is displayed in the control screen. The emulation program 3 also has a function for accepting registration of setting information according to a user input operation. The setting information indicates, for example, information for use in management of the information processing apparatus and information for virtually setting a physical or logical configuration of the information processing apparatus. For example, in response to input of a predetermined control command from a user, the emulation program 3 modifies the response information for the control command in accordance with the registered setting information.

The user terminal 20 may include a manual displaying unit 21, a transmission requesting unit 22, and an edition processing unit 23. The manual displaying unit 21, the transmission requesting unit 22, and the edition processing unit 23 are functions implemented by a CPU of the user terminal 20 executing a predetermined program. For example, the manual displaying unit 21, the transmission requesting unit 22, and the edition processing unit 23 are implemented by execution of a display program for displaying the electronic manual 1.

The manual displaying unit 21 causes the display device to display the electronic manual 1. The displayed image of the electronic manual 1 includes a program-transmission requesting image for requesting transmission of the electronic-manual editing program 2. Once the user terminal 20 accepts a user input operation on the program-transmission requesting image with the electronic manual 1 being displayed, the transmission requesting unit 22 requests the download server 10 to transmit the electronic-manual editing program 2. The transmission requesting unit 22 may also have a function for activating the electronic-manual editing program 2 after the user terminal 20 receives the requested electronic-manual editing program 2.

The edition processing unit 23 edits data of the electronic manual 1 and modifies a configuration of the displayed image of the electronic manual 1. When the electronic-manual editing program 2 is executed in the user terminal 20, the edition processing unit 23 edits the data of the displayed electronic manual 1 and dynamically modifies the configuration of the displayed image of the electronic manual 1 under control of the electronic-manual editing program 2.

The user terminal 20 implements functions of a setting controlling unit 31 and an edition-operation controlling unit 32 by causing the CPU to execute the electronic-manual editing program 2 received from the download server 10. The user terminal 20 further implements a function of an operation setting unit 41 by causing the CPU to execute the emulation program 3 received from the download server 10.

The setting controlling unit 31 causes the emulation program 3 to display a setting screen for accepting registration of setting information in the emulation program 3 received from the download server 10. More specifically, the setting controlling unit 31 activates the operation setting unit 41 implemented by the emulation program 3 to display the setting screen. The operation setting unit 41 functions to virtually accept management information of an emulation-target information processing apparatus and setting information regarding a physical or logical configuration of the information processing apparatus. Upon accepting input of setting information through a user input operation on the setting screen, the operation setting unit 41 sets the input setting information in the emulation program 3.

The edition processing unit 23 is controlled by the edition-operation controlling unit 32 to edit data of the electronic manual 1. In response to a user operation, the edition-operation controlling unit 32 requests the edition processing unit 23 to include, in the displayed image of the electronic manual 1, at least a program activation image for activating the emulation program 3.

A procedure for editing the electronic manual 1 will now be described.

The manual displaying unit 21 loads data of the electronic manual 1 and causes the display device to display the electronic manual 1. In this state, a user performs an input operation, such as clicking, on the program-transmission requesting image included in the displayed image of the electronic manual 1. In response to the input operation on the program-transmission requesting image, the transmission requesting unit 22 requests the download server 10 to transmit the electronic-manual editing program 2. The program-transmission requesting image corresponds to, for example, a link image specifying a location of the electronic-manual editing program 2 in a network to request transmission of the electronic-manual editing program 2.

The transmission-request receiving unit 11 of the download server 10 receives the program transmission request from the transmission requesting unit 22. Once the transmission-request receiving unit 11 receives the program transmission request, the program transmitting unit 12 transmits, to the user terminal 20, the electronic-manual editing program 2 and the emulation program 3.

The program transmitting unit 12, for example, successively transmits the electronic-manual editing program 2 and the emulation program 3. Alternatively, the program transmitting unit 12 may transmit the electronic-manual editing program 2 that includes the embedded emulation program 3. In this case, the emulation program 3 may be separated from the electronic-manual editing program 2 after execution of the electronic-manual editing program 2 in the user terminal 20, for example.

The program transmitting unit 12 may also transmit only the electronic-manual editing program 2 to the user terminal 20 in response to reception of the transmission request from the transmission requesting unit 22. In this case, the transmission-request receiving unit 11 may receive a transmission request of the emulation program 3 during execution of the electronic-manual editing program 2 in the user terminal 20. Once the transmission-request receiving unit 11 receives the transmission request of the emulation program 3, the program transmitting unit 12 transmits the emulation program 3 to the user terminal 20.

Upon receiving the electronic-manual editing program 2, the user terminal 20 automatically executes the electronic-manual editing program 2. The electronic-manual editing program 2 received by the user terminal 20 may be activated in response to, for example, an activation request from the transmission requesting unit 22.

After activation of the electronic-manual editing program 2, the setting controlling unit 31 activates the received emulation program 3 and requests the activated operation setting unit 41 to display an operation setting screen. The operation setting unit 41 displays the setting screen on the display device displaying the electronic manual 1 to accept input of setting information from a user. After completion of inputting of the setting information, the operation setting unit 41 registers the input setting information in the emulation program 3. At this time, the setting information is stored in, for example, a setting table of the emulation program 3.

After the operation setting unit 41 completes the setting processing, the setting controlling unit 31 terminates execution of the emulation program 3 and then notifies the edition-operation controlling unit 32 of the completion of the setting processing. Upon receiving the notification, the edition-operation controlling unit 32 requests the edition processing unit 23 to include, in the displayed image of the electronic manual 1, a program activation image for activating the emulation program 3 in response to a user operation. Upon receiving the request from the edition-operation controlling unit 32, the edition processing unit 23 edits data of the electronic manual 1. At this time, the program activation image is newly included in the image of the electronic manual 1 displayed by the manual displaying unit 21.

The edition-operation controlling unit 32 may request the edition processing unit 23 to embed the emulation program 3 in the data of the electronic manual 1. In this case, the emulation program 3 embedded in the electronic manual 1 is activated in response to a user input operation on the program activation image. Additionally, when the data of the electronic manual 1 is moved, the emulation program 3 embedded in the electronic manual 1 is also moved with the data of the electronic manual 1.

When the emulation program 3 is embedded in the data of the electronic manual 1, the edition processing unit 23 may include, in the displayed image of the electronic manual 1, an identification image indicating embedding of the emulation program 3. In this case, the emulation program 3 embedded in the electronic manual 1 may be activated in response to a user input operation on the identification image. That is, the identification image functions as the program activation image in this case.

The emulation program 3 is then activated in response to a user input operation, such as clicking, on the program activation image. After activation of the emulation program 3, a control screen for accepting input of a control command, for example, is displayed on the display device displaying the electronic manual 1. If a control command is input through a user input operation, response information for the input control command, for example, is displayed in the control screen. As the response information for the control command, information based on the information set in the emulation program 3 under control of the setting controlling unit 31 is displayed. The setting information may be registered in the emulation program 3 in accordance with the control command.

An operation of the edition-operation controlling unit 32 may be executed immediately after activation of the electronic-manual editing program 2 without execution of an operation of the setting controlling unit 31. In this case, in response to an input operation on the program activation image included in the displayed electronic manual 1, the emulation program 3 is activated to have a state initially set at the time of transmission from the download server 10.

In the above-described data transmission system, once a user performs an input operation on the program-transmission requesting image included in the displayed image of the electronic manual 1, the electronic manual 1 is edited and the program activation image for activating the emulation program 3 is included in the displayed electronic manual 1. Accordingly, the user browsing the electronic manual 1 can simulatively experience a remote control operation of an information processing apparatus by performing an input operation on the program activation image to activate the emulation program 3. Thus, the user easily understands the remote control operation of the information processing apparatus.

Since information is set in the emulation program 3 before edition of the electronic manual 1, the emulation program 3 having the setting is activated from the program activation image. Thus, convenience of the user utilizing the emulation program 3 improves.

Figure 2:
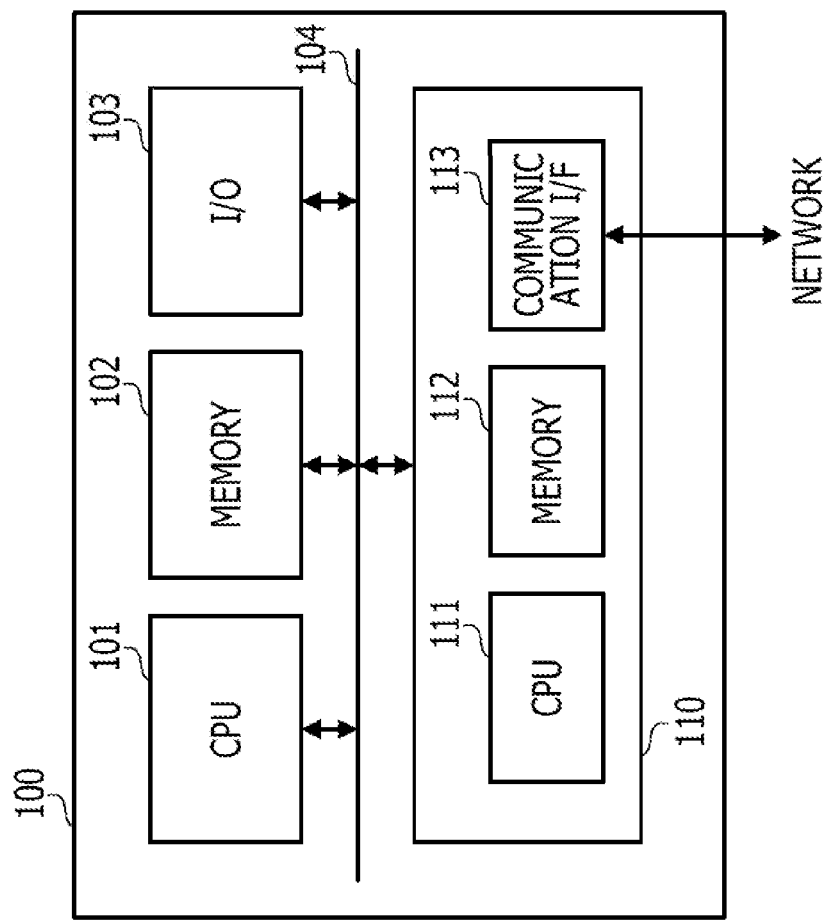
FIG. 2 illustrates an example of a configuration of a server.

In a second embodiment, a server illustrated in FIG. 2 is treated as an example of an information processing apparatus remotely controlled from an external apparatus. A description will be given for a system for downloading an electronic manual and an emulation program for this server.

FIG. 2 is a diagram illustrating an example of a configuration of a server.

A server 100 may include a CPU 101, a memory 102, an input/output (I/O) 103, and a service processor 110, which are connected to each other through an internal bus 104.

The CPU 101 executes programs stored in the memory 102 to implement processing according to the programs. The memory 102 may be, for example, a nonvolatile storage medium, such as a read only memory (ROM) or a hard disk drive (HDD), or a volatile storage medium, such as a random access memory (RAM). The I/O 103 may be, for example, an input device for accepting data input through an input operation and an output device for outputting data.

The server 100 may include more than one CPU 101, more than one memory 102, and more than one I/O 103. For example, the server 100 may include slots receiving boards, each including one CPU 101, one memory 102, and one I/O 103. The boards inserted into the slots may be connected to each other through the internal bus 104.

The service processor 110 manages the server 100. The service processor 110 implements, for example, a function for monitoring a status of each unit of the server 100 and recording a log of the status, a function for registering and authenticating users utilizing the server 100, and a function for setting and monitoring domains of the server 100. The domain indicates a logically divided unit of processing functions provided by the CPU 101 of the server 100.

The service processor 110 includes a CPU 111, a memory 112, and a communication interface (I/F) 113. The CPU 111 executes programs stored in the memory 112 to implement the above-described functions. The communication I/F 113 is connected to a network to allow the CPU 101 and an external terminal to exchange data over the network. The service processor 110 receives a control command from the external terminal over the network and operates in accordance with the control command.

The service processor 110 provides the external terminal, for example, a control screen for accepting various control commands. Upon receiving, from the external terminal, a control command for requesting registration or setting of information on the control screen, the service processor 110 registers the received information in a management table stored in the memory 112. The service processor 110 also sets the received information in the hardware of the server 100 as needed. Information that can be registered or set in response to a request from the external terminal includes, for example, user account information and domain setting information.

Upon receiving a control command requesting displaying of registered or set information input on the control screen from the external terminal, the service processor 110 reads out the requested information from the management table. The service processor 110 also acquires the requested information from predetermined hardware of the server 100 as needed. The service processor 110 then transmits the requested information to the external terminal and causes the external terminal to display the information in the control screen. Information that can be transmitted in response to a request from the external terminal includes, for example, user registration information and information on a system configuration or an operation status of the server 100.

Figure 3:
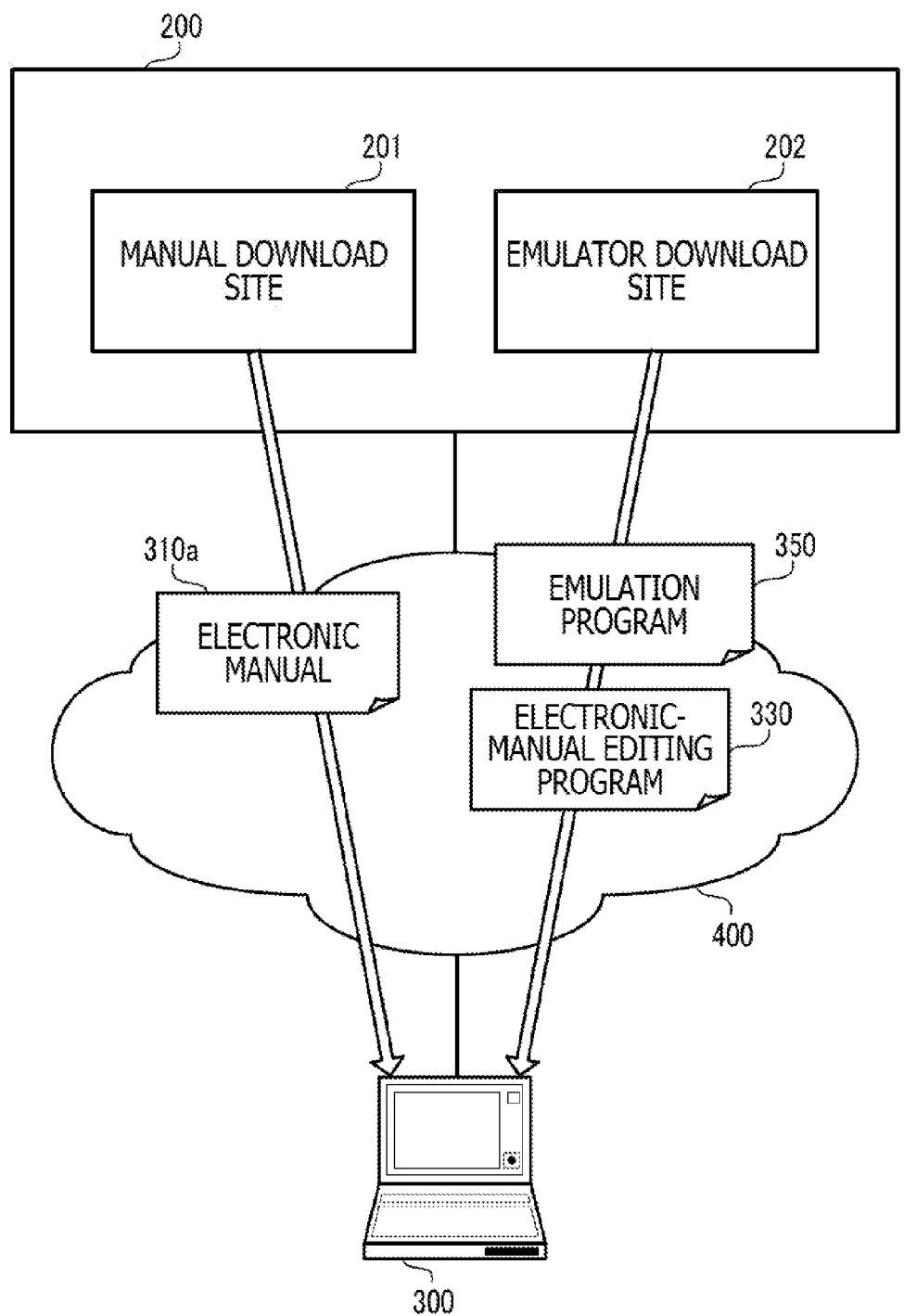
FIG. 3 illustrates a configuration of a data transmission system according to a second embodiment.

A description will be now given for a data transmission system for transmitting an electronic manual that includes a procedure for controlling the service processor 110 of the server 100 and an emulation program emulating the control operation of the service processor 110. FIG. 3 is a diagram illustrating a configuration of a data transmission system according to the second embodiment.

The data transmission system according to this embodiment may include a download server 200 and a user terminal 300. The download server 200 and the user terminal 300 are connected via a network 400. More than one user terminal 300 may be connected to the network 400.

The download server 200 is a web server for providing a manual download site 201 and an emulator download site 202. The user terminal 300 accesses the manual download site 201 to download an electronic manual 310a that includes the procedure for controlling the service processor 110. The user terminal 300 also accesses the emulator download site 202 to download an electronic-manual editing program 330 and an emulation program 350 for the electronic manual 310a downloaded from the manual download site 201.

Different download servers may provide the manual download site 201 and the emulator download site 202.

Figure 4:
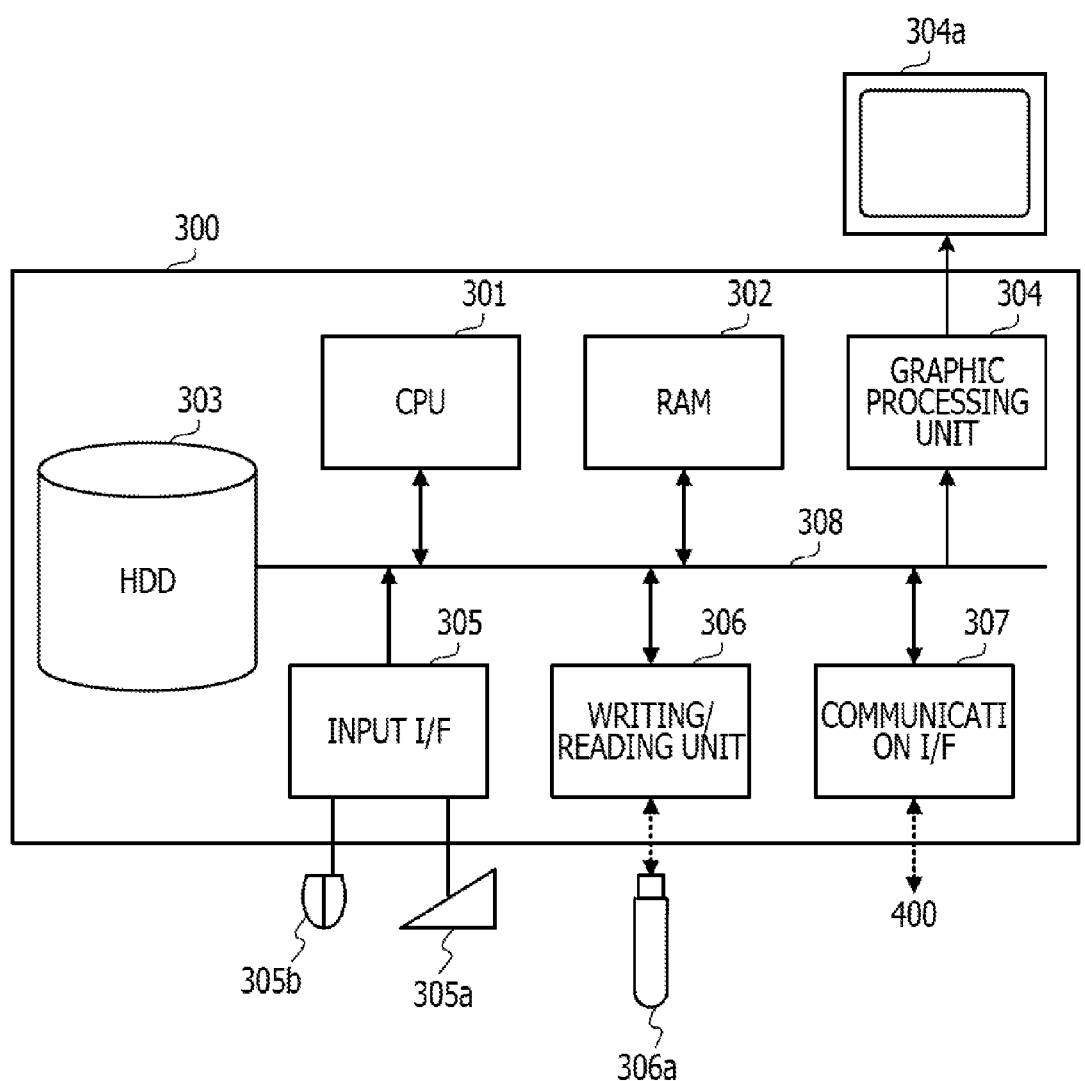
FIG. 4 illustrates an example of a hardware configuration of a user terminal.

FIG. 4 is a diagram illustrating an example of a hardware configuration of the user terminal 300.

The user terminal 300 may include a CPU 301, a RAM 302, an HDD 303, a graphic processing unit 304, an input interface (I/F) 305, a writing/reading unit 306, and a communication interface (I/F) 307, which are connected to each other through a bus 308.

The CPU 301 executes various programs stored in a storage medium, such as the HDD 303, to control the user terminal 300 in an integrated fashion. The RAM 302 temporarily stores at least some of the programs executed by the CPU 301 and various kinds of data for use in processing implemented by the programs. The HDD 303 stores programs executed by the CPU 301 and various kinds of data for use in execution of the programs.

The graphic processing unit 304 is connected to a monitor 304a, for example. The graphic processing unit 304 displays an image on a screen of the monitor 304a in accordance with an instruction of the CPU 301. The input I/F 305 is connected to, for example, a keyboard 305a and a mouse 305b. The input I/F 305 sends signals fed from the keyboard 305a and the mouse 305b to the CPU 301 through the bus 308.

The writing/reading unit 306 writes data received from the CPU 301 through the bus 308 in a portable storage medium 306a. The writing/reading unit 306 also reads data from the portable storage medium 306a and sends the data to the CPU 301 through the bus 308. For example, an optical disc, a flexible disk, and a semiconductor memory connected through a universal serial bus (USB) interface may be adopted as the portable storage medium 306a.

The communication I/F 307 exchanges data with an external apparatus, such as the download server 200, via the network 400.

The download server 200 can be implemented with a hardware configuration similar to that illustrated in FIG. 4.

Figure 5:
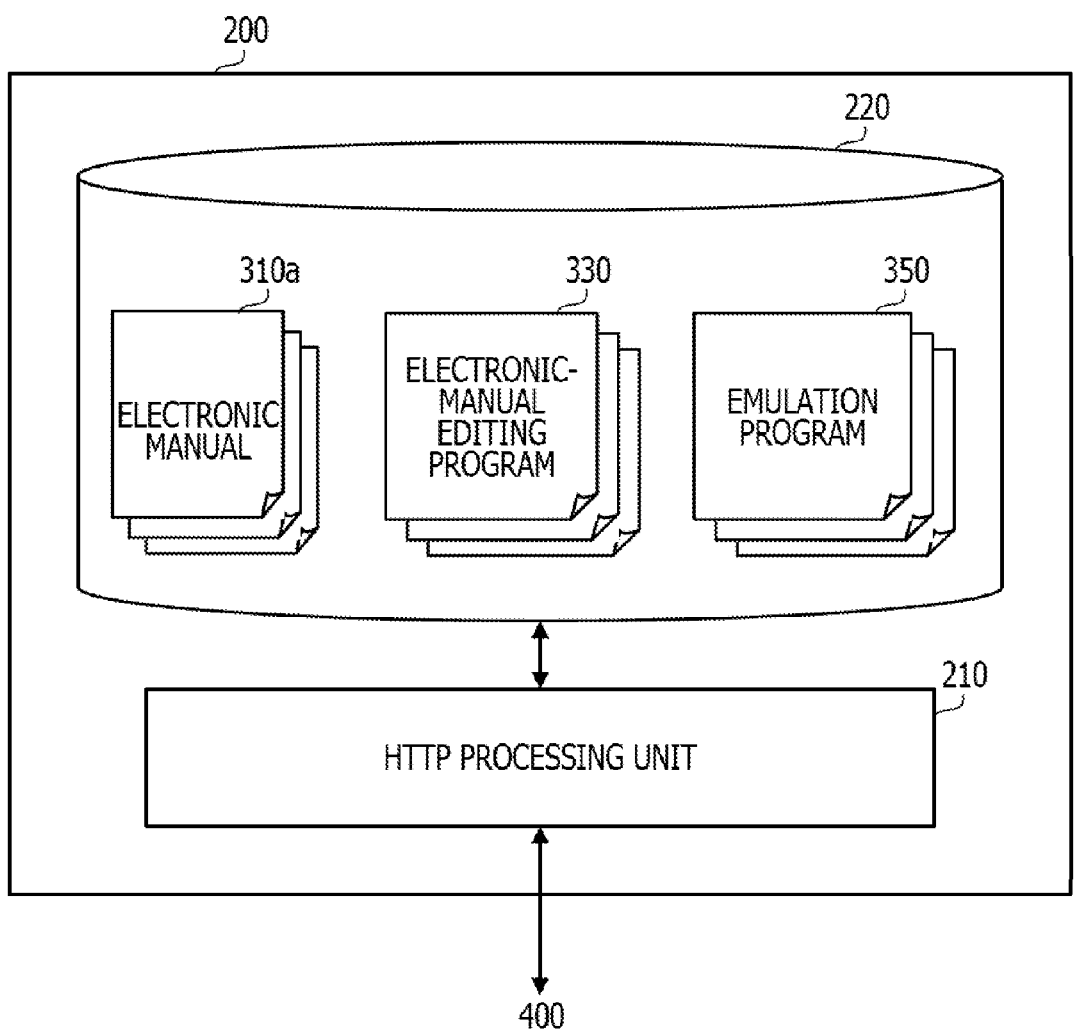
FIG. 5 is a block diagram illustrating functions of a download server.

FIG. 5 is a block diagram illustrating functions of the download server 200.

The download server 200 may include a hypertext transfer protocol (HTTP) processing unit 210 and a data storage unit 220.

A function of the HTTP processing unit 210 is implemented by execution of a predetermined server program. The HTTP processing unit 210 receives an HTTP message from a device, such as the user terminal 300, over the network 400 and returns a response for the message. The HTTP processing unit 210 transmits, to a device having transmitted an HTTP message, a display data of a web page specified by a uniform resource locator (URL) included in the message, for example. Additionally, the HTTP processing unit 210 transmits, to a device having transmitted an HTTP message, data of the electronic manual 310a, the electronic-manual editing program 330, and the emulation program 350 that are specified by URLs included in the message.

Although the programs are transmitted using HTTP in this example, the programs may be transmitted using other communication protocols, such as a file transfer protocol (FTP).

The data storage unit 220 is implemented by, for example, an HDD connected to the download server 200. The data storage unit 220 stores the electronic manual 310a, the electronic-manual editing program 330, and the emulation program 350 to be downloaded by the user terminal 300.

The electronic manual 310a and the emulation program 350 are prepared, for example, for each kind of program executed by the service processor 110. The electronic manual 310a and the emulation program 350 may be prepared for each version of program executed by the service processor 110.

The electronic-manual editing program 330 is prepared at least for each electronic manual 310a. Each electronic-manual editing program 330 may have a similar program structure, but the target electronic manual 310a edited by each electronic-manual editing program 330 differs from one another. Accordingly, for example, information included in the electronic-manual editing program 330 that indicates an insertion position of a link image in a displayed image of the corresponding electronic manual 310a differs for each electronic-manual editing program 330.

Figure 6:
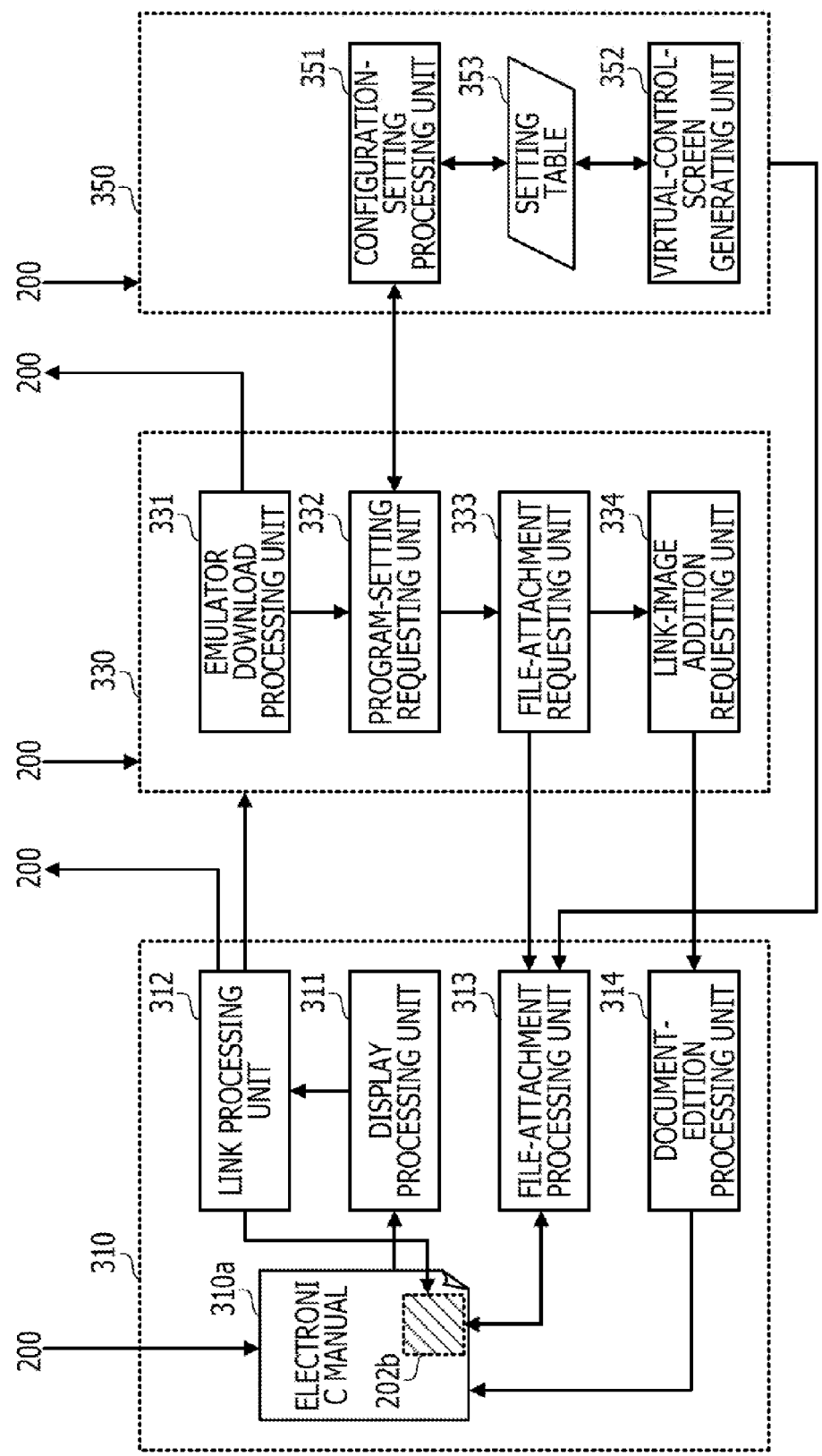
FIG. 6 is a block diagram illustrating functions of a user terminal.

FIG. 6 is a block diagram illustrating functions of the user terminal 300.

The user terminal 300 has functions implemented by execution of a document displaying program 310: a display processing unit 311, a link processing unit 312, a file-attachment processing unit 313, and a document-edition processing unit 314. The user terminal 300 also has functions implemented by execution of the electronic-manual editing program 330: an emulator download processing unit 331, a program-setting requesting unit 332, a file-attachment requesting unit 333, and a link-image addition requesting unit 334. The user terminal 300 further has functions implemented by execution of the emulation program 350: a configuration-setting processing unit 351 and a virtual-control-screen generating unit 352.

The display processing unit 311 loads document data to be displayed by the document displaying program 310, such as the electronic manual 310a, to cause a display device to display an electronic document based on the document data.

In response to a user input operation on a link image included in the electronic document displayed by the display processing unit 311, the link processing unit 312 executes processes written in the document data in association with the link image. For example, the link processing unit 312 accesses a URL associated with the link image in the document data to request the URL to transmit data. When the requested data is a program, the link processing unit 312 may also request execution of the program after reception of the program. The link processing unit 312 may further activate a program associated with the link image. More specifically, the link processing unit 312 may activate, for example, a program embedded in the electronic manual 310a.

The file-attachment processing unit 313 embeds, as an attached file, a predetermined file in the document data displayed by the document displaying program 310. The document-edition processing unit 314 edits the document data displayed by the document displaying program 310. More specifically, the document-edition processing unit 314 edits the document data so that, for example, a link image is displayed in the electronic document.

The file-attachment processing unit 313 and the document-edition processing unit 314 can operate in accordance with a request from an external program. In this embodiment, the file-attachment processing unit 313 and the document-edition processing unit 314 embeds a program file and adds a link image in the electronic manual 310a, respectively, in response to a request from the electronic-manual editing program 330.

In response to activation of the electronic-manual editing program 330, the emulator download processing unit 331 accesses the download server 200 to request the download server 200 to transmit the emulation program 350.

The program-setting requesting unit 332 activates the configuration-setting processing unit 351 of the emulation program 350 to cause the configuration-setting processing unit 351 to set a virtual configuration of the emulation-target server 100.

The file-attachment requesting unit 333 requests the file-attachment processing unit 313 to embed, as an attached file, the emulation program 350 in the electronic manual 310a. The link-image addition requesting unit 334 requests the document-edition processing unit 314 to include a link image for activating the emulation program 350 in a displayed image of the electronic manual 310a.

The file-attachment requesting unit 333 and the link-image addition requesting unit 334 call the file-attachment processing unit 313 and the document-edition processing unit 314, respectively, in accordance with, for example, an application program interface (API) provided by the document displaying program 310. The file-attachment requesting unit 333 and the link-image addition requesting unit 334 then output control information to the file-attachment processing unit 313 and the document-edition processing unit 314, respectively, to request execution of the foregoing processing.

The configuration-setting processing unit 351 sets a virtual configuration of the emulation-target server 100 in a setting table 353. More specifically, the configuration-setting processing unit 351 causes the display device to display a configuration setting screen for allowing a user to virtually set the configuration of the server 100. The configuration-setting processing unit 351 then sets, in the setting table 353, the information input through a user input operation on the configuration setting screen.

The virtual-control-screen generating unit 352 generates a virtual control screen reproducing a control screen for use in controlling of the service processor 110 and causes the display device to display the generated screen. In response to input of a control command through a user operation on the virtual control screen, the virtual-control-screen generating unit 352 virtually implements an operation to be executed by the service processor 110 in accordance with the input control command. For example, in response to input of a control command for requesting registration of user account information, the virtual-control-screen generating unit 352 sets the user account information input with the control command in the setting table 353. In response to input of a control command for requesting displaying of information set in the setting table 353, the virtual-control-screen generating unit 352 reads out the requested information from the setting table 353 and displays the information in the virtual control screen.

Processing for executing the emulation program 350 will be described in detail later.

A description will be now given for processing for embedding the emulation program 350 in the electronic manual 310a.

As described above, the electronic manual 310a is provided from the manual download site 201 of the download server 200. A user, for example, activates a browser program in the user terminal 300 to access the manual download site 201. In the user terminal 300, a web page of the manual download site 201 is then displayed on a screen (browser screen) of the browser program.

The user selects a desired one of the electronic manuals 310a displayed in the web page to request the download server 200 to transmit the selected electronic manual 310a. In response to the download request from the user terminal 300, the download server 200 transmits the selected electronic manual 310a to the user terminal 300. The user terminal 300 then stores the electronic manual 310a in, for example, the HDD 303.

If the user then performs an input operation to open a file of the electronic manual 310a in the user terminal 300, the document displaying program 310 activates. At this time, the display processing unit 311 loads the electronic manual 310a and causes the monitor 304a to display an image of the electronic manual 310a.

Figure 7:
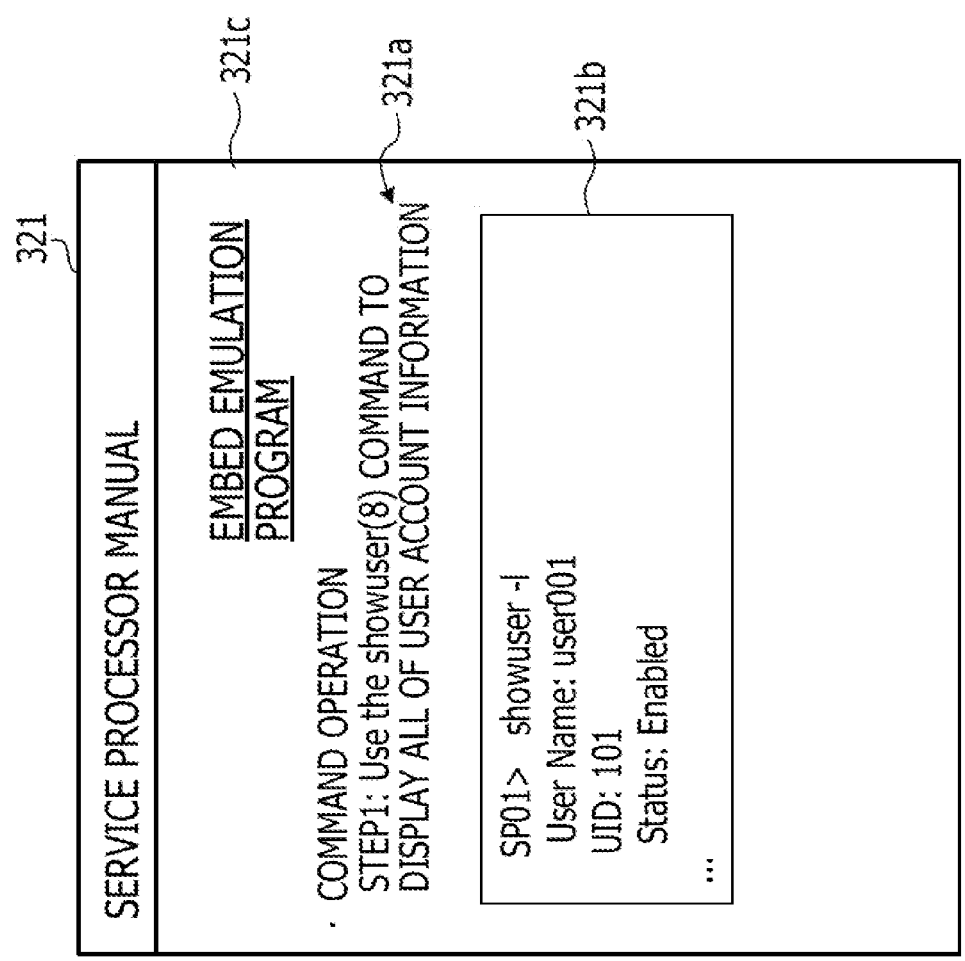
FIG. 7 illustrates a display example of an electronic manual.

FIG. 7 is a diagram illustrating an example of the electronic manual 310a displayed on a screen.

The display processing unit 311 causes the monitor 304a to display a document display screen 321 so that the document display screen 321 includes images based on the loaded data of the electronic manual 310a. In the example illustrated in FIG. 7, the document display screen 321 includes an explanation 321a for explaining a command operation for the service processor 110 and a control screen example 321b of the service processor 110. The document display screen 321 also includes a link image 321c instructing embedding of the emulation program 350 in the electronic manual 310a. If a user clicks the link image 321c in the state illustrated in FIG. 7, processing for editing the electronic manual 310a starts.

Figure 8:
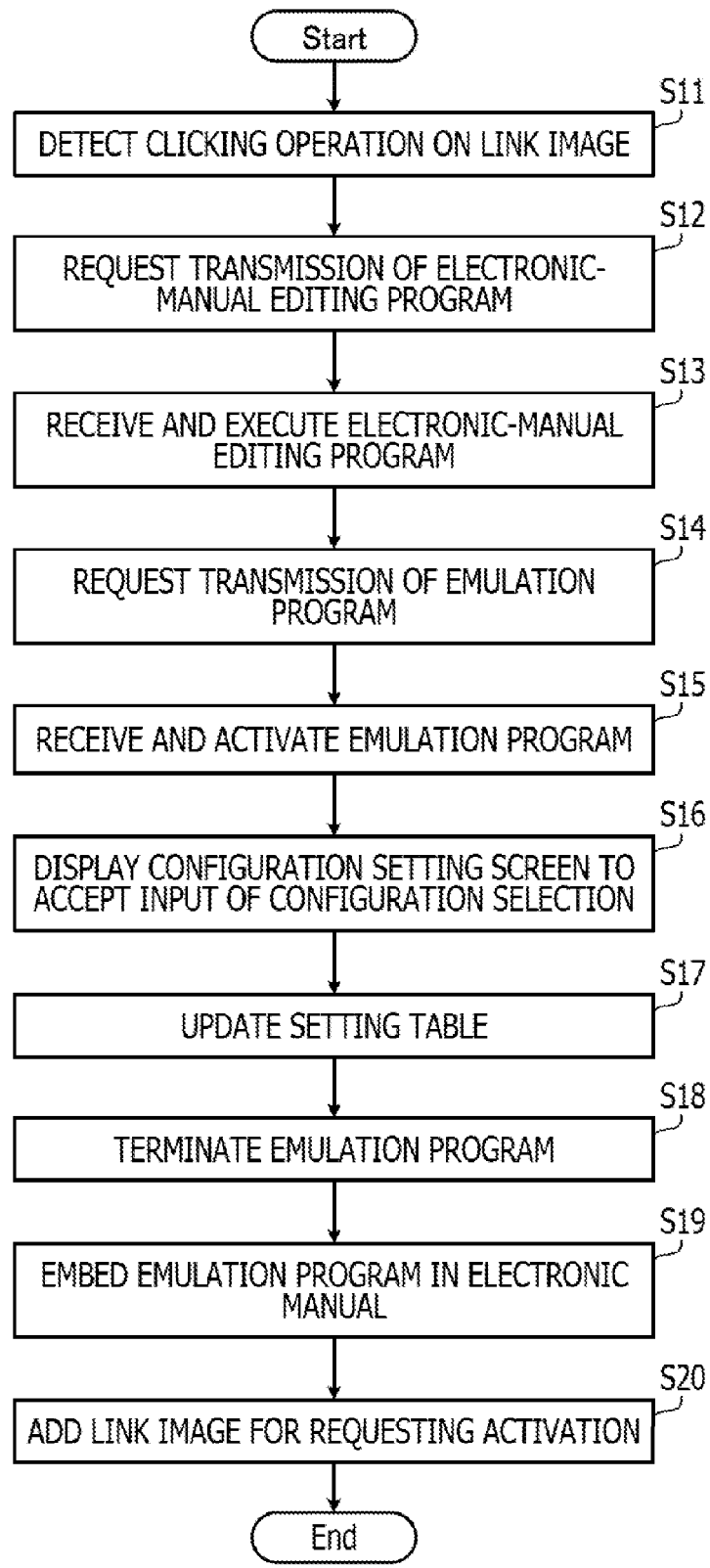
FIG. 8 is a flowchart illustrating a procedure for processing for editing an electronic manual.

FIG. 8 is a flowchart illustrating a procedure for editing the electronic manual 310a.

In S11, upon detecting clicking of the link image 321c of the electronic manual 310a displayed on the monitor 304a, the display processing unit 311 of the user terminal 300 notifies the link processing unit 312 of the detection.

In S12, the link processing unit 312 accesses a URL associated with the clicked link image 321c on the basis of the data of the electronic manual 310a to request the download server 200 to transmit the electronic-manual editing program 330. In response to the transmission request from the user terminal 300, the HTTP processing unit 210 of the download server 200 transmits, to the user terminal 300, the electronic-manual editing program 330 corresponding to the specified URL.

In S13, the user terminal 300 receives and stores the electronic-manual editing program 330 in the HDD 303. The user terminal 300 also executes the electronic-manual editing program 330 stored in the HDD 303. For example, the link image 321c clicked in S11 is further associated with execution of the requested program in the data of the electronic manual 310a. In such a case, in S13, execution of the received electronic-manual editing program 330 is requested in processing of the link processing unit 312 based on the data of the electronic manual 310a.

In S13, the monitor 304a may display a warning image for warning the user of execution of the electronic-manual editing program 330 once reception of the electronic-manual editing program 330 completes. In this case, in response to a user input operation for permitting execution of the program on the warning image, execution of the electronic-manual editing program 330 starts.

In S14, the emulator download processing unit 331 accesses a URL written in the electronic-manual editing program 330 to request the download server 200 to transmit the emulation program 350. In response to the transmission request from the user terminal 300, the HTTP processing unit 210 of the download server 200 transmits, to the user terminal 300, the emulation program 350 corresponding to the specified URL.

In S14, the following processing may be executed. Once the emulator download processing unit 331 accesses the URL written in the electronic-manual editing program 330, the HTTP processing unit 210 of the download server 200 transmits, to the user terminal 300, data of a web page providing the emulation program 350. In the user terminal 300, the web page is then displayed on the monitor 304a by processing of the emulator download processing unit 331 or processing of a browser program. The web page includes link images for a plurality of emulation programs 350 of different versions, for example. In response to a user clicking operation on one of the link images, the user terminal 300 accesses a URL corresponding to the clicked link image. The HTTP processing unit 210 of the download server 200 transmits, to the user terminal 300, the emulation program 350 corresponding to the accessed URL.

In S15, the user terminal 300 receives the emulation program 350 transmitted from the download server 200. The emulator download processing unit 331 then activates the received emulation program 350.

In S16, the program-setting requesting unit 332 calls the configuration-setting processing unit 351 of the emulation program 350. The program-setting requesting unit 332 requests the configuration-setting processing unit 351 to execute processing for setting a configuration. The configuration-setting processing unit 351 causes the monitor 304a to display a configuration setting screen. The configuration-setting processing unit 351 then accepts a user selection operation on the displayed configuration setting screen.

On the configuration setting screen, a hardware configuration and a domain configuration of the emulation-target server 100 are set. A user can simulatively experience a control operation of the server 100 having the desired hardware and domain configurations by performing the setting operation using this configuration setting screen. The configuration setting screen will be described in detail later.

In S17, in response to clicking of a completion button included in the configuration setting screen, the configuration-setting processing unit 351 updates information stored in the setting table 353 to information input on the configuration setting screen. After updating the information stored in the setting table 353, the configuration-setting processing unit 351 notifies the program-setting requesting unit 332 of the completion of the updating processing.

In S18, the program-setting requesting unit 332 terminates execution of the emulation program 350.

In S19, the file-attachment requesting unit 333 requests the file-attachment processing unit 313 to embed the emulation program 350 in the electronic manual 310a. In response to the request from the file-attachment requesting unit 333, the file-attachment processing unit 313 embeds the emulation program 350 having the updated setting table 353 in the electronic manual 310a. Furthermore, in S19, an identification image indicating embedding of the emulation program 350 may be included in the displayed image of the electronic manual 310a.

In S20, the link-image addition requesting unit 334 requests the document-edition processing unit 314 to include, in the displayed image of the electronic manual 310a, a link image for activating the emulation program 350 embedded in the electronic manual 310a. At this time, the link-image addition requesting unit 334 notifies the document-edition processing unit 314 of a position of the link image in the displayed image of the electronic manual 310a.

In response to the request from the link-image addition requesting unit 334, the document-edition processing unit 314 edits the data of the electronic manual 310a to display the link image for activating the emulation program 350 at the requested position of the displayed image of the electronic manual 310a.

After execution of the foregoing processing, execution of the electronic-manual editing program 330 terminates. At this point, the document display screen 321 displayed on the monitor 304a includes the link image for activating the embedded emulation program 350 as illustrated by an example of FIG. 9.

Figure 9:
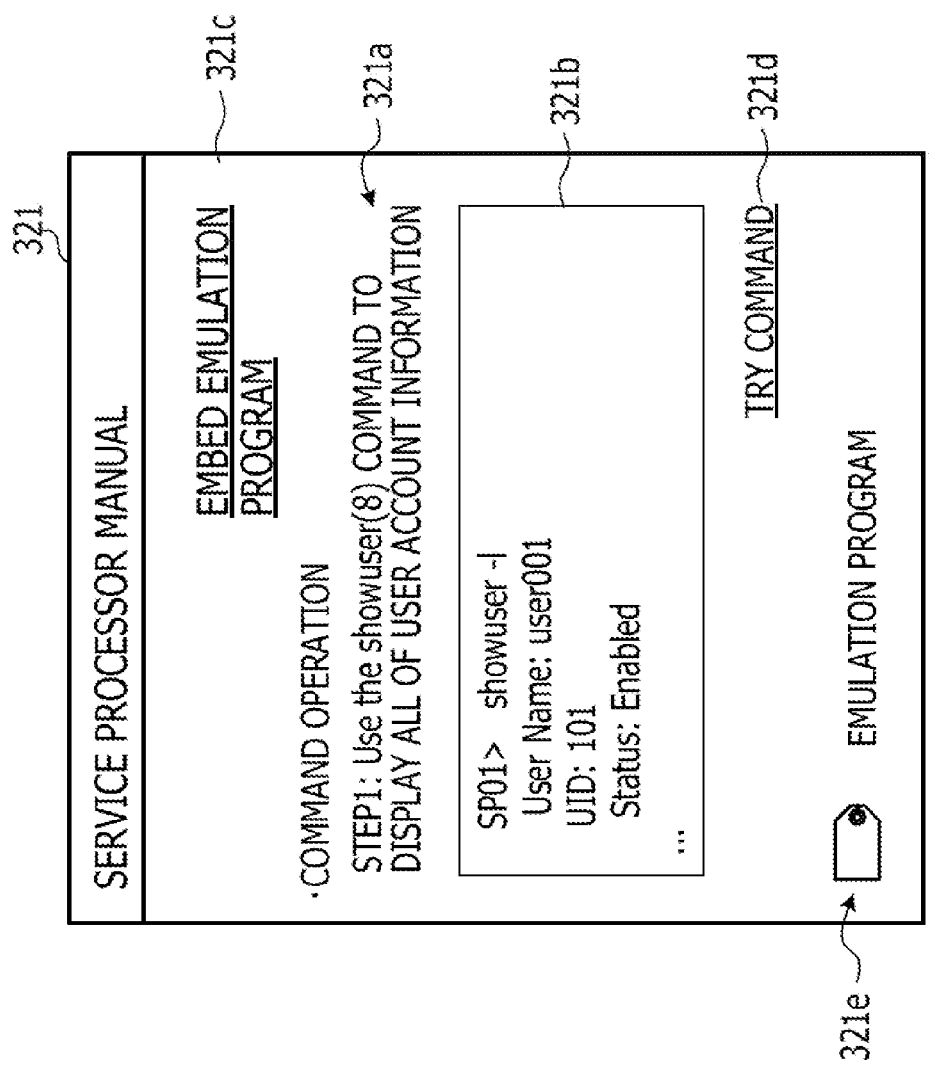
FIG. 9 illustrates a display example of an electronic manual that includes an embedded emulation program.

FIG. 9 is a diagram illustrating a display example of the electronic manual 310a that includes the embedded emulation program 350.

In the example of FIG. 9, a link image 321d for activating the emulation program 350 is added in the document display screen 321 illustrated in FIG. 7. In response to a user clicking operation on the link image 321d, the emulation program 350 embedded in the electronic manual 310a is activated.

In the example of FIG. 9, the document display screen 321 further includes an identification image 321e for indicating embedding of the emulation program 350 in the data of the electronic manual 310a. The identification image 321e may simply indicate that the emulation program 350 is embedded in the data of the electronic manual 310a. Alternatively, the embedded emulation program 350 may be executed once a user successively performs clicking operations (a double clicking operation) on the identification image 321e.

Figure 10:
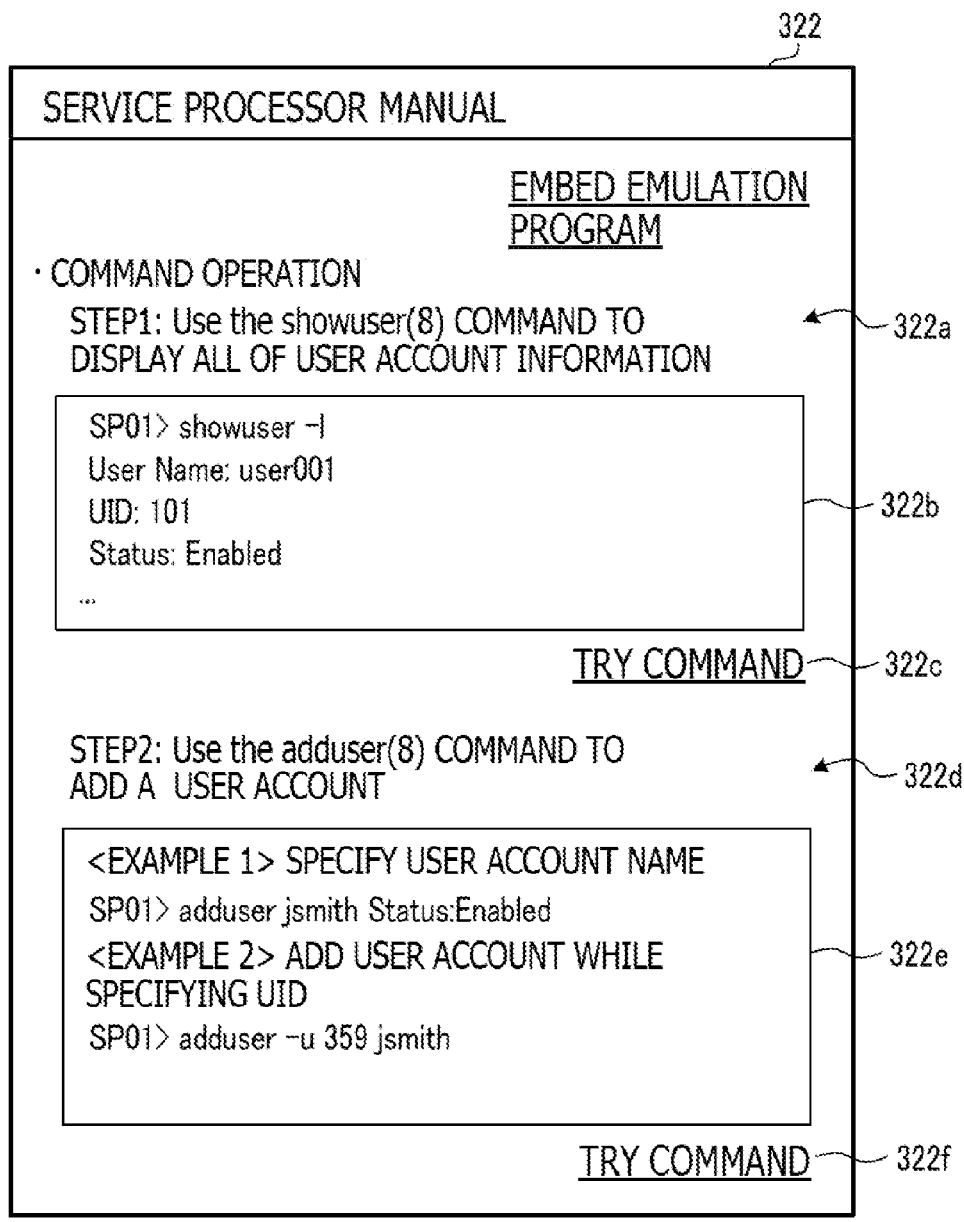
FIG. 10 illustrates another display example of an electronic manual that includes an embedded emulation program.

FIG. 10 is a diagram illustrating another display example of the electronic manual 310a that includes the embedded emulation program 350.

In a document display screen 322 illustrated in FIG. 10, a link image 322c for activating the emulation program 350 is displayed under an explanation 322a for explaining a command operation and a control screen example 322b of the service processor 110. The document display screen 322 also includes an explanation 322d for explaining another command operation and another control screen example 322e of the service processor 110. A link image 322f for activating the emulation program 350 is also displayed under the control screen example 322e.

The link image for activating the emulation program 350 can be displayed at a given position in the displayed image of the electronic manual 310a in accordance with the content of the electronic-manual editing program 330. Thus, convenience for users browsing the electronic manual 310a can be improved.

The emulation program 350 is embedded in the electronic manual 310a by the processing illustrated in FIG. 8. Accordingly, for example, even if a file of the electronic manual 310a is opened after being moved, the link image for activating the emulation program 350 is included in the displayed image of the electronic manual 310a. The user can activate the emulation program 350 by clicking the link image.

Figure 11:
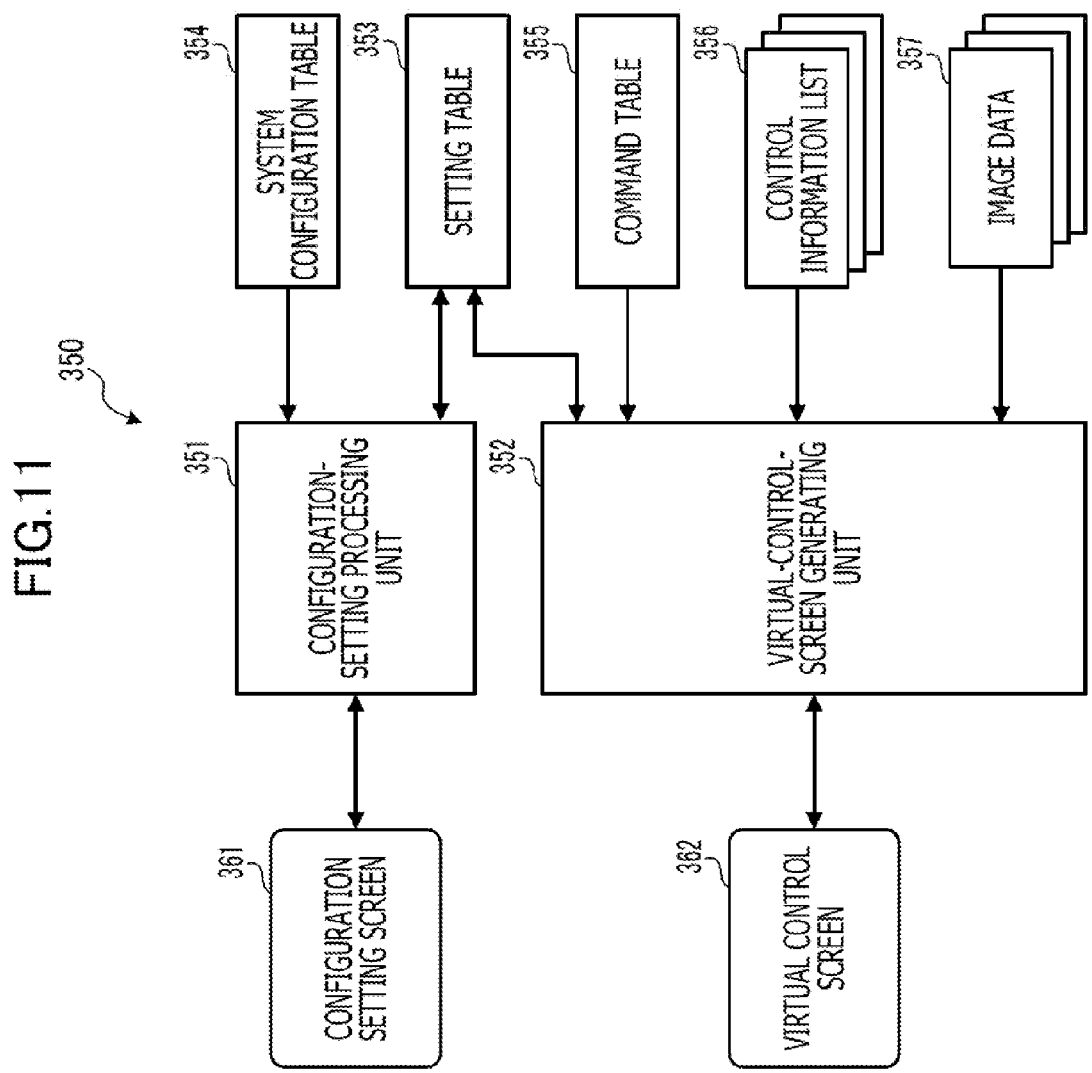
FIG. 11 describes a program structure of an emulation program.

Processing implemented by execution of the emulation program 350 will now be described. FIG. 11 is a diagram describing a program structure of the emulation program 350.

As described above, the functions of the configuration-setting processing unit 351 and the virtual-control-screen generating unit 352 are implemented by execution of the emulation program 350 in the user terminal 300. The emulation program 350 may include the foregoing setting table 353, a system configuration table 354, a command table 355, a control information list 356, and image data 357.

The system configuration table 354 holds information on hardware and domain configurations of one or more possible emulation-target server. The setting table 353 holds information on the hardware and domain configurations selected through a user input operation. The configuration-setting processing unit 351 generates a configuration setting screen 361 on the basis of the system configuration table 354 and the setting table 353 and causes the monitor 304a to display the generated configuration setting screen 361. The configuration-setting processing unit 351 also updates the setting table 353 using information input through a user operation on the configuration setting screen 361.

The command table 355 holds a list of control commands acceptable in a virtual control screen 362. The control information list 356 is provided for each control command held in the command table 355 and holds control information for the corresponding command. The image data 357 holds image templates to be displayed in the virtual control screen 362 in accordance with a control command input through a user operation.

The virtual-control-screen generating unit 352 generates the virtual control screen 362 and causes the monitor 304a to display the generated virtual control screen 362. In response to input of a control command through a user operation on the virtual control screen 362, the virtual-control-screen generating unit 352 executes processing for the control command on the basis of the command table 355 and the control information list 356. When a setting control command is input, the virtual-control-screen generating unit 352 registers information input with the control command in the setting table 353. The virtual-control-screen generating unit 352 also displays response information in the virtual control screen 362 on the basis of the image data 357 and information of the setting table 353 as needed. When a display control command is input, the virtual-control-screen generating unit 352 displays response information in the virtual control screen 362 on the basis of the image data 357 and information of the setting table 353.

FIG. 12 is a diagram illustrating an example of information held in the system configuration table 354.

In this embodiment, the emulation program 350 can set a plurality of models of server as emulation targets, for example. The system configuration table 354 holds, for each model of the server, the number of mountable hardware components and the number of settable domains. For example, in FIG. 12, a server of a model A can mount up to four (0th-3rd) CPUs and can set up to two (0th-1st) domains.

FIG. 13 is a diagram illustrating an example of information held in the setting table 353.

The setting table 353 holds hardware and domain configurations of an emulation-target server that are set by a user through the configuration setting screen 361. For example, in FIG. 13, three (0th-2nd) CPUs are mounted and two (0th and 1st) domains are set in a model A. The setting table 353 also holds information input by a user through the virtual control screen 362. As such information, the example of FIG. 13 includes a user name, a user ID, and a network address.

The setting table 353 also holds a selection flag indicating a model selected by a user from a plurality of models. The selection flag is set to "1" for the selected model and to "0" for the other models.

Although information can be set for each of the models A, B, and C in the example of FIG. 13, information for one of the models A, B, and C selected by the user may be set in the setting table 353. When the information is set in the setting table 353 for one of the models A, B, and C selected by the user, the selection flag is not used.

Figure 14:
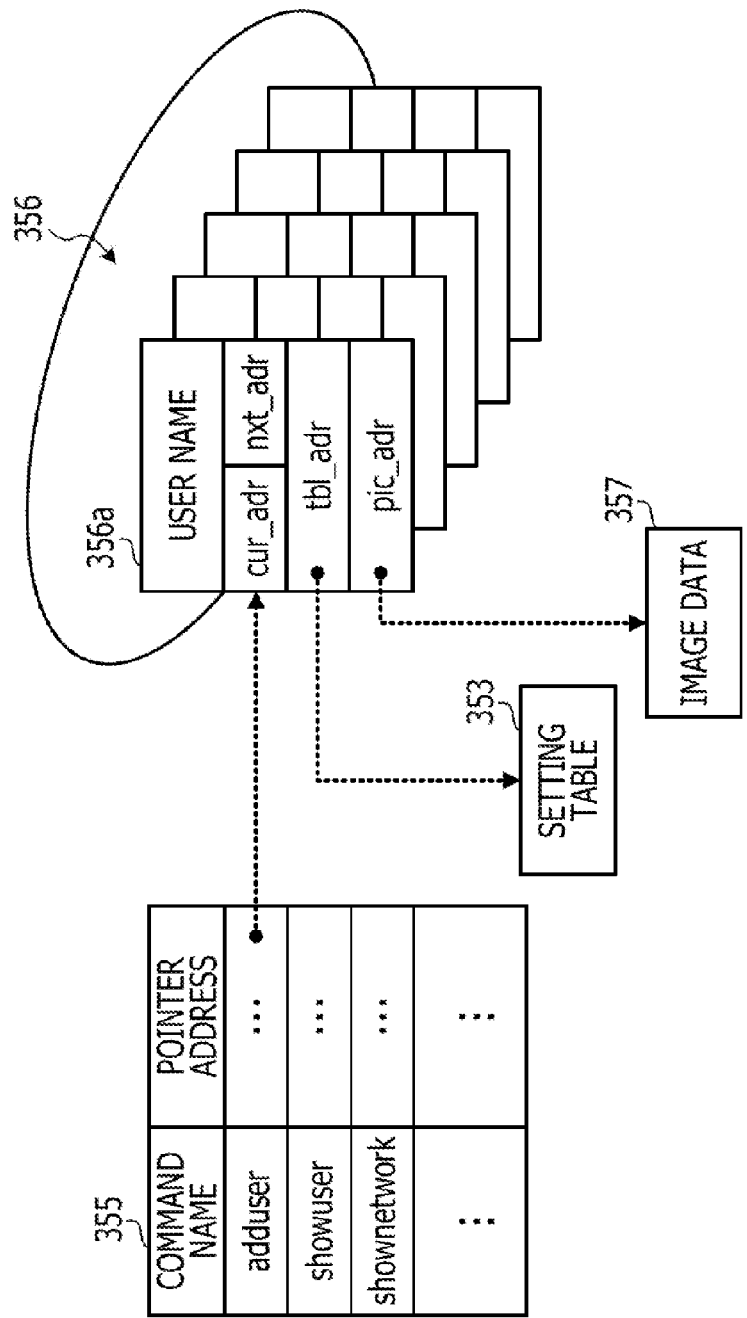
FIG. 14 describes a command table and a control information list.

FIG. 14 is a diagram describing the command table 355 and the control information list 356.

A control command input on the virtual control screen 362 has a command name and an option name. The command name is for generally identifying a requested operation. For example, a command name "adduser" included in the command table 355 illustrated in FIG. 14 indicates a command for requesting setting of user account information. The option name is control information for specifying the requested operation in detail with the command name. The option name is input in combination with specification data specified by the user.

For example, when "adduser -u 359 jsmith" is input on the virtual control screen 362, "adduser" corresponds to the command name, "-u" corresponds to the option name, and "359" and "jsmith" correspond to the specification data. The expression "adduser -u 359 jsmith" indicates a control command for requesting setting of a user name "jsmith" for a user ID "359".

The command table 355 holds command names acceptable on the virtual control screen 362. The control information list 356 is separately provided for each of the control commands held in the command table 355. One control information list 356 includes a plurality of entries 356a linked by pointers, i.e., in a linked list structure. One entry 356a holds information corresponding to one option name.

The command table 355 holds a command name in association with a pointer address pointing to a first entry of the control information list 356 corresponding to the command name. The entry 356a holds a current pointer address cur_adr and a pointer address nxt_adr of the following entry 356a for the same command name. Accordingly, the virtual-control-screen generating unit 352 can identify one entry 356a corresponding to the combination of the command name and the option name on the basis of the pointer address held in the command table 355 and the pointer addresses cur_adr and nxt_adr held in the entry 356a.

The entry 356a further holds a pointer address tbl_adr pointing to a location of data in the setting table 353 and a pointer address pic_adr pointing to one piece of image data 357. The pointer address tbl_adr is held for each piece of the specification data. The pointer address pic_adr is written in the entry 356a of the option name regarding which response information is to be displayed.

Figure 15:
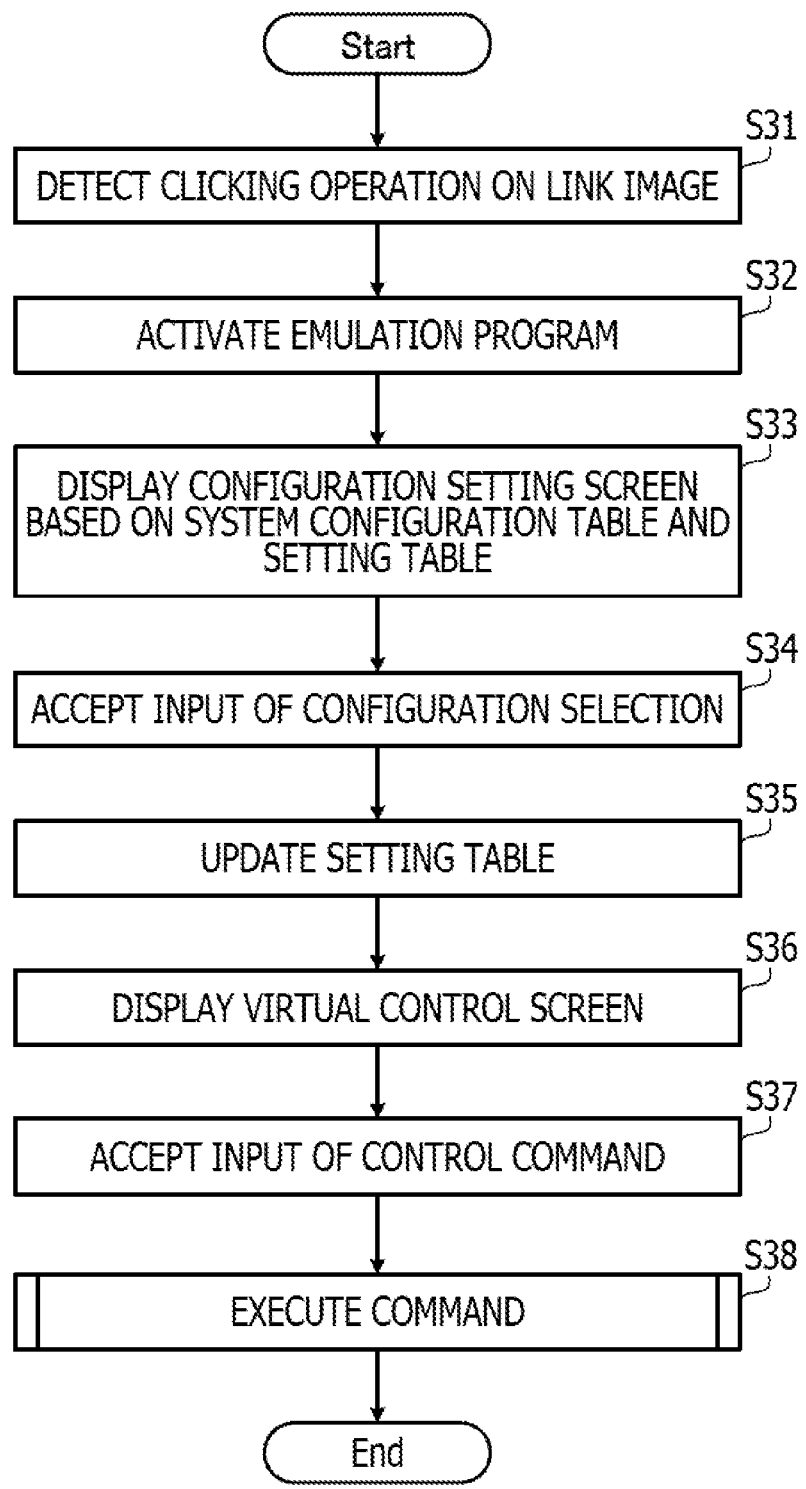
FIG. 15 is a flowchart illustrating a procedure for executing an emulation program.

FIG. 15 is a flowchart illustrating a procedure for executing the emulation program 350.

In S31, the electronic manual 310a that includes the embedded emulation program 350 is displayed on the monitor 304a of the user terminal 300 by the processing of the display processing unit 311. In this state, a user clicks a link image (e.g., the link image 321d illustrated in FIG. 9) for requesting activation of the emulation program 350 displayed in the electronic manual 310a. Upon detecting clicking of the link image, the display processing unit 311 notifies the link processing unit 312 of the detection.

In S32, the link processing unit 312 activates the emulation program 350 embedded in the displayed electronic manual 310a.

In S33, the configuration-setting processing unit 351 of the emulation program 350 causes the monitor 304a to display the configuration setting screen 361 on the basis of the system configuration table 354 and the setting table 353.

In S34, the configuration-setting processing unit 351 accepts input of a configuration selected by a user on the configuration setting screen 361.

Figure 16:
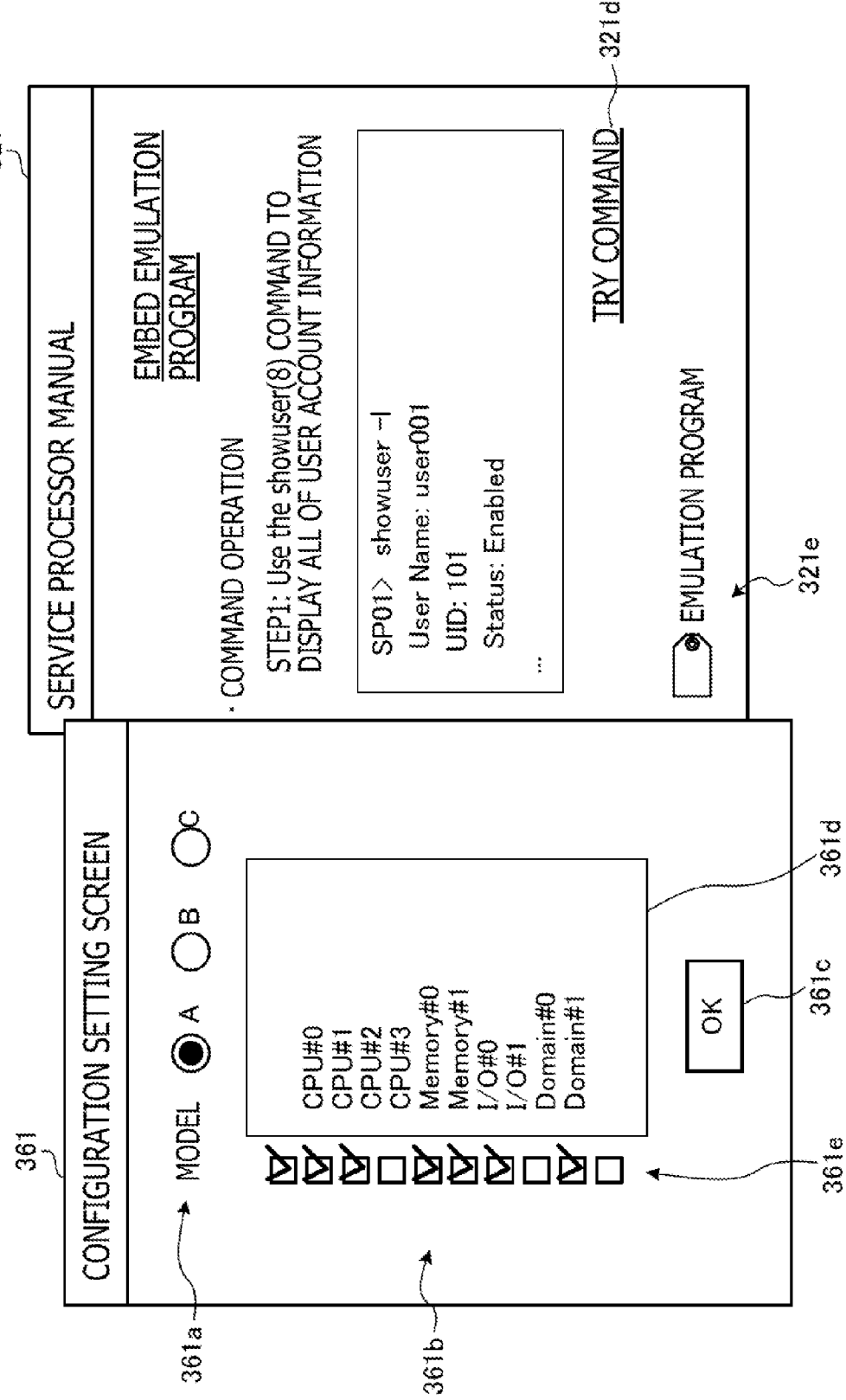
FIG. 16 illustrates a display example of a configuration setting screen.

FIG. 16 is a diagram illustrating a display example of the configuration setting screen 361. The processing in S33 and S34 will be described in detail with reference to FIG. 16.

In S33, the configuration setting screen 361 is displayed on the monitor 304a with the document display screen 321 for displaying the electronic manual 310a. The configuration setting screen 361 includes a model selecting part 361a, a system-configuration selecting part 361b, and a completion button 361c.

The model selecting part 361a accepts input for selecting a model of the emulation-target server. A list of the selectable hardware components and domains are displayed at a list displaying part 361d of the system-configuration selecting part 361b. Check images 361e are displayed that indicate whether the respective listed hardware components and domains are selected. The completion button 361c accepts an input operation indicating completion of the configuration selection.

As selectable models, the configuration-setting processing unit 351 displays, at the model selecting part 361a, the models stored in the system configuration table 354. One of the displayed models is selected with a radio button at the model selecting part 361a. The configuration-setting processing unit 351 displays a list of mountable hardware components and settable domains of the selected model at the list displaying part 361d of the system-configuration selecting part 361b.

The configuration-setting processing unit 351 also modifies a state of each check image 361e in accordance with the information stored in the setting table 353 corresponding to the model selected at the model setting part 361a. For example, when three (0th-2nd) of four mountable CPUs are registered in the setting table 353, the configuration-setting processing unit 351 sets the check images 361e for "CPU#0", "CPU#1", and "CPU#2" to a selected state and the check image 361e for "CPU#3" to an unselected state as illustrated by the example of FIG. 16.

The setting table 353 stores, as the selection flag, the selection state of the model selecting part 361a at the time of a previous clicking operation on the completion button 361c. In S33, the configuration-setting processing unit 351 sets the selection state of the model selecting part 361a on the basis of the selection flag of the setting table 353. In accordance with the selection state of the model selecting part 361a, the configuration-setting processing unit 351 generates information to be displayed at the system-configuration selecting part 361b on the basis of the system configuration table 354 and the setting table 353.

In S34, the configuration-setting processing unit 351 modifies selection states of the model selecting part 361a, the list displaying part 361d, and the check images 361e in accordance with a user input operation.

The configuration-setting processing unit 351 may have a function for automatically setting each check image 361e for the hardware component and domain displayed in the list displaying part 361d in response to a selection operation on a predetermined radio button displayed in the configuration setting screen 361, for example.

Referring back to FIG. 15, the description is continued.

In S35, in response to clicking of the completion button 361c, the configuration-setting processing unit 351 updates the setting table 353 in accordance with the selection states of the model selecting part 361a and the check images 361e. For example, when the model B is selected at the model selecting part 361a, the selection flag for the model A is set to "0" in the setting table 353, whereas the selection flag for the model B is set to "1". Additionally, when the check images 361e for "CPU#0", "CPU#1", "CPU#2", and "CPU#3" are in the selected state, four (0th-3rd) CPUs are registered for the model B in the setting table 353. When the selected states of the model selecting part 361a and the check images 361e are maintained, the setting table 353 is not updated.

In S36, the configuration-setting processing unit 351 closes the configuration setting screen 361. The virtual-control-screen generating unit 352 causes the monitor 304a to display the virtual control screen 362 with the document display screen 321 displaying the electronic manual 310a.

In S37, the virtual-control-screen generating unit 352 accepts user's inputting of a control command on the virtual control screen 362.

In S38, the virtual-control-screen generating unit 352 operates in accordance with the control command input in S37. Processing executed in S38 will be described in detail later.

The processing in S37 and S38 of the flowchart illustrated in FIG. 15 can be repeatedly executed. Additionally, the processing in S33-S35 can be executed with the virtual control screen 362 being displayed in S36. For example, an image for requesting displaying of the configuration setting screen 361 is included in the virtual control screen 362. The processing in S33 is executed in response to detection of clicking of the image.

The processing executed by the configuration-setting processing unit 351 in S16 and S17 of FIG. 8 is basically the same as that executed in S33-S35 of FIG. 15. In S16 of FIG. 8, information is displayed at the model selecting part 361a, the list displaying part 361d, and the check images 361e of the configuration setting screen 361 in accordance with a predetermined rule because no valid information is set in the setting table 353. For example, in S16, the model A is selected at the model selecting part 361a, whereas all of the check images 361e are selected at the system-configuration selecting part 361b.

In S17 of FIG. 8, information input on the configuration setting screen 361 is set in the setting table 353. Accordingly, the information set in the setting table 353 in S17 is reflected in the configuration setting screen 361 in S33 of FIG. 15 corresponding to the processing implemented by execution of the emulation program 350 thereafter. In S33-S35, a user often does not change but merely confirms the selected setting on the configuration setting screen 361 before the processing in S36 is executed. Thus, emulation having the user setting can be immediately executed in response to execution of the emulation program 350. Displaying of the configuration setting screen 361 may be skipped immediately after execution of the emulation program 350 in the processing illustrated in FIG. 15.

The screen displayed on the monitor 304a in S17 corresponds to, for example, the display example of the document display screen 321 illustrated in FIG. 16 without the link image 321d and the identification image 321e.

Figure 17:
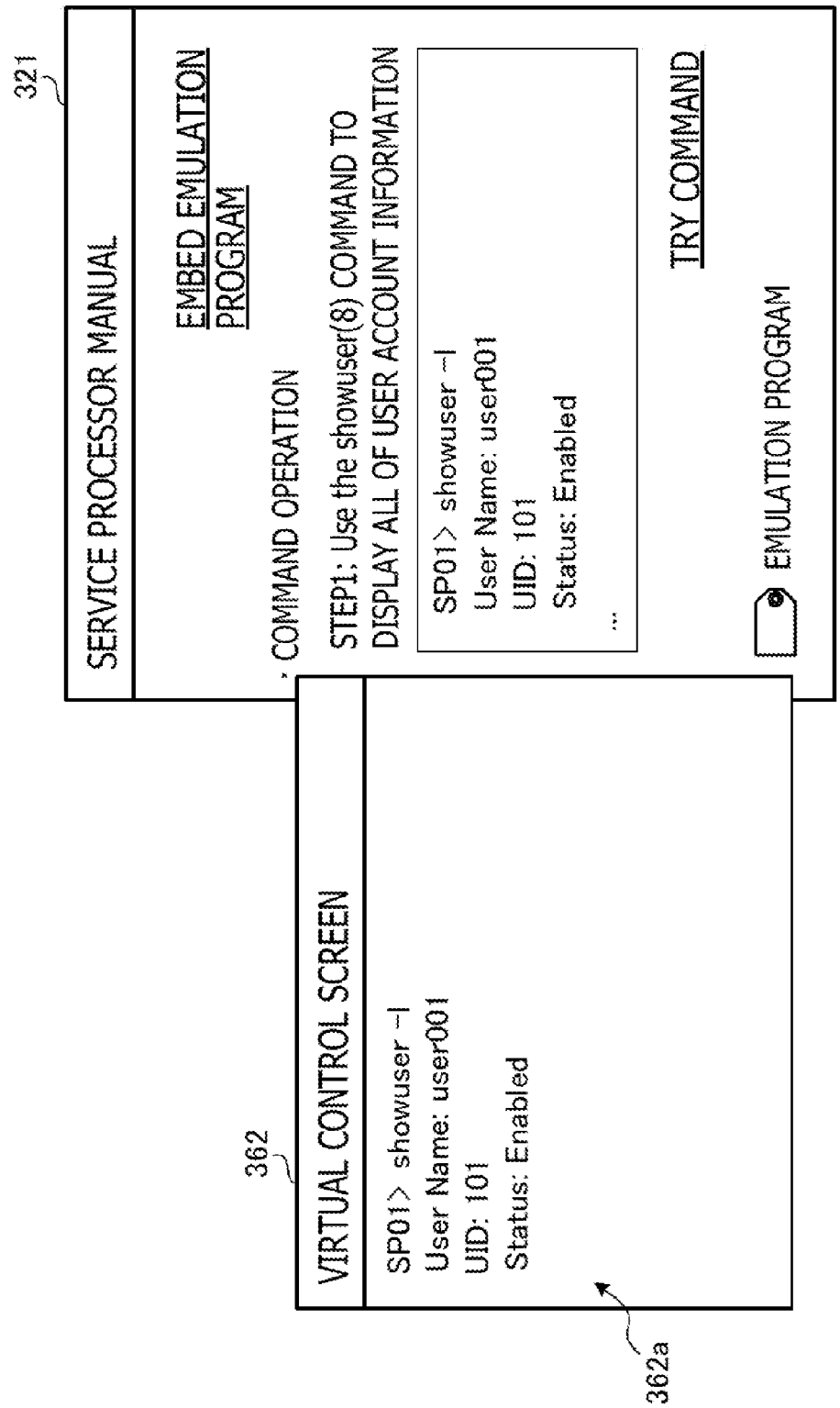
FIG. 17 illustrates a display example of a virtual control screen.

FIG. 17 is a diagram illustrating a display example of a virtual control screen.

A virtual control screen 362a displays an input control command and response information for the control command. In the example illustrated in FIG. 17, a control command "showuser -I" is input by a user. The expression "showuser" indicates a command name for requesting displaying of user account information, whereas the expression "-1" indicates an option name for requesting displaying of a user name and a user ID. Accordingly, as response information for the control command "showuser -1", "user001" representing the user name and "101" representing the user ID are displayed in the example illustrated in FIG. 17.

When the emulation program 350 is activated in response to clicking of a link image included in the electronic manual 310a as described in the example of FIG. 15, the virtual control screen 362 is displayed on the monitor 304a with the document display screen 321 displaying the electronic manual 310a as illustrated in the example of FIG. 17. A user can simulatively experience a control operation by, for example, inputting a control command on the virtual control screen 362a as needed while browsing the electronic manual 310a. Thus, the user can easily understand the control operation of a server.

The processing in S38 of FIG. 15 will now be described for a case where a setting control command is input and a case where a display control command is input. The setting control command is for requesting setting of data in the setting table 353, whereas the display control command is for requesting displaying of data set in the setting table 353.

Figure 18:
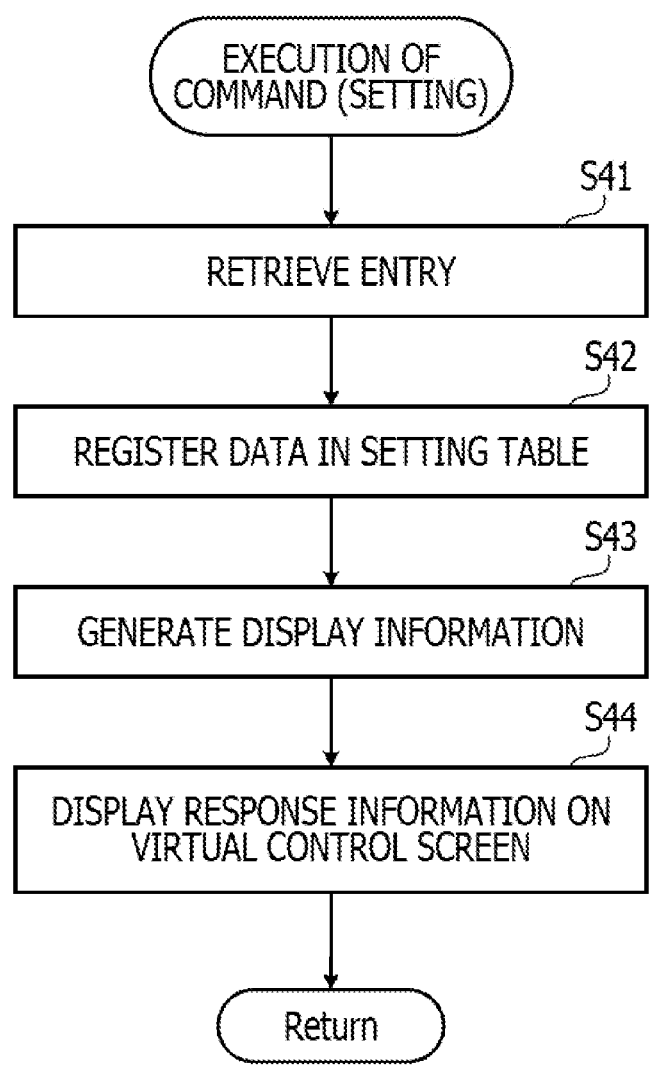
FIG. 18 is a flowchart illustrating a procedure for executing a setting control command.

FIG. 18 is a flowchart illustrating a procedure for executing a setting control command.

In S41, the virtual-control-screen generating unit 352 retrieves the entry 356a corresponding to the input option name from the control information list 356 corresponding to the command name input on the virtual control screen 362a.

More specifically, the virtual-control-screen generating unit 352 acquires a pointer address corresponding to the command name input on the virtual control screen 362a with reference to the command table 355. The virtual-control-screen generating unit 352 then identifies the first entry of the control information list 356 pointed to by the acquired pointer address. Furthermore, the virtual-control-screen generating unit 352 sequentially follows the next entry on the basis of the pointer address nxt_adr of the current entry to retrieve the entry corresponding to the option name input on the virtual control screen 362a.

In S42, the virtual-control-screen generating unit 352 sets specification data input with the control command on the virtual control screen 362a at a location of the setting table 353 pointed to by the pointer address tbl_adr written in the retrieved entry 356a. For example, two pointer addresses tbl_adr are written in the entry 356a corresponding to the option name "-u". In response to input of "adduser -u 359 jsmith" on the virtual control screen 362a, the virtual-control-screen generating unit 352 sets the specification data "359" and "jsmith" at locations of the setting table 353 pointed to by the respective pointer addresses tbl_adr.

In S43, if the retrieved entry 356a has the valid pointer address pic_adr, the virtual-control-screen generating unit 352 acquires the image data 357 pointed to by the pointer address pic_adr. The virtual-control-screen generating unit 352 also stores the data set in the setting table 353 in S42 at a predetermined position of the acquired image data 357 to generate display information.

A user may input a plurality of option names in combination with one command name on the virtual control screen 362a. For example, a user can input "adduser -u[specification data] -h[specification data]" using option names "-u" and "-h". In this case, the virtual-control-screen generating unit 352 executes processing based on the entries 356a corresponding to the input option names. More specifically, the virtual-control-screen generating unit 352 repeats the processing in S41-S43 as many times as the number of the input option names.

In S44, if the display information is generated in S43, the virtual-control-screen generating unit 352 displays the generated display information serving as response information on the virtual control screen 362a.

Figure 19:
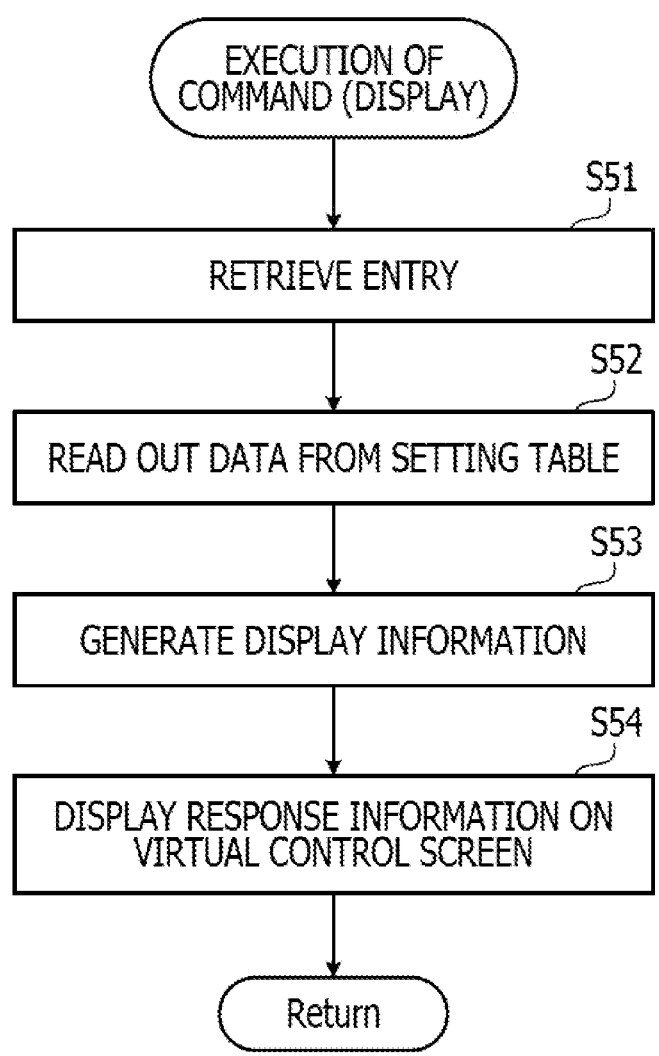
FIG. 19 is a flowchart illustrating a procedure for executing a display control command.

FIG. 19 is a flowchart illustrating a procedure for executing a display control command.

In S51, the virtual-control-screen generating unit 352 retrieves the entry 356a corresponding to the input option name from the control information list 356 corresponding to the command name input on the virtual control screen 362a in a procedure similar to that of S41.

In S52, the virtual-control-screen generating unit 352 reads out data from a location of the setting table 353 pointed to by the pointer address tbl_adr written in the retrieved entry 356a.

For example, when displaying of user account information is requested with a command name and an option name, data regarding the user name and the user ID is read out from the setting table 353. When displaying of hardware configuration information is requested with a command name and an option name, data regarding hardware, such as the number of mounted CPUs, is read out from the setting table 353. When displaying of domain configuration information is requested with a command name and an option name, data regarding the domain configuration, such as the number of domains, is read out from the setting table 353.

In S53, the virtual-control-screen generating unit 352 acquires the image data 357 pointed to by the pointer address pic_adr written in the retrieved entry 356*a*. The virtual-control-screen generating unit 352 then stores the data read out from the setting table 353 in S52 at a predetermined position of the acquired image data 357 to generate display information.

Like the setting control command, a user can input a plurality of option names in combination with one command name for the display control command on the virtual control screen 362*a*. When a control command having a plurality of option names is input, the virtual-control-screen generating unit 352 repeats the processing in S51-S53 as many times as the number of option names to execute processing based on the entries 356*a* corresponding to respective option names.

If the display information is generated in S53, the virtual-control-screen generating unit 352 displays the generated display information serving as response information on the virtual control screen 362*a*.

The emulation program 350 having been described with reference to FIGS. 11-19 mainly emulates operations for setting information in a server and for displaying information set in the server. Emulating only such control operations can simplify the structure and procedure of the emulation program 350, and, thus, can suppress a development cost. The virtual control screen 362*a* is displayed by execution of the emulation program 350 on a monitor displaying the corresponding electronic manual 310*a*. Accordingly, the emulation program 350 can sufficiently help a user to understand control operations even if a complex program completely reproducing the control operations of the server is not used.

The emulation program 350 may be embedded in the electronic manual 310*a* by the processing of the electronic-manual editing program 330 and then utilized as an individual program after being separated from the electronic manual 310*a*. For example, the file-attachment processing unit 313 of the document displaying program 310 executes the processing for separating the emulation program 350 from the electronic manual 310*a*. When the emulation program 350 separated from the electronic manual 310*a* is executed, the configuration setting screen 361 and the virtual control screen 362*a* are displayed on a monitor independently from the electronic manual 310*a*.

FIG. 20 is a flowchart illustrating a procedure for updating the emulation program 350 embedded in the electronic manual 310*a*.

When a version of a program executed by the service processor 110 of the server 100 is updated, the emulator download site 202 provides the emulation program 350 supporting the updated program. In this case, a user activates in the user terminal 300 the electronic-manual editing program 330 having been installed by the processing illustrated in FIG. 8. In the user terminal 300, the updated emulation program 350 is downloaded and the emulation program 350 currently embedded in the electronic manual 310*a* is updated to the downloaded emulation program 350 in a procedure illustrated in FIG. 20.

In S61, the emulator download processing unit 331 accesses the download server 200 to request the download server 200 to transmit the emulation program 350 in a manner similar to that of the processing in S14 of FIG. 8. In response to the transmission request from the user terminal 300, the HTTP processing unit 210 of the download server 200 transmits the updated emulation program 350 to the user terminal 300.

Like the processing described in S14, a web page providing the emulation program 350 may be displayed in the user terminal 300 in S61. In this case, if the web page includes link images for a plurality of emulation programs 350 of different versions, a user can select and download the emulation program 350 of a desired version therefrom. The download server 200 transmits the selected emulation program 350 to the user terminal 300.

In S62, the user terminal 300 receives the emulation program 350 transmitted from the download server 200.

In S63, the program-setting requesting unit 332 causes the monitor 304*a* to display a confirmation image for allowing a user to determine whether to change a configuration through the configuration setting screen. In response to a user operation for selecting changing of the configuration (e.g., clicking of a YES button displayed in the confirmation image), processing in S64 is executed. In response to a user operation for selecting maintaining of the configuration (e.g., clicking of a NO button displayed in the confirmation image), processing in S68 is executed.

In S64, the program-setting requesting unit 332 activates the newly received emulation program 350 to call the configuration-setting processing unit 351.

In S65, the program-setting requesting unit 332 requests the configuration-setting processing unit 351 to execute processing for setting the configuration. The configuration-setting processing unit 351 causes the monitor 304*a* to display the configuration setting screen and then accepts input of user selection on the displayed configuration setting screen.

In S66, in response to clicking of the completion button included in the configuration setting screen, the configuration-setting processing unit 351 updates the information stored in the setting table 353 to the information input on the configuration setting screen. After updating the information, the configuration-setting processing unit 351 notifies the program-setting requesting unit 332 of the completion.

In S67, the program-setting requesting unit 332 terminates execution of the received emulation program 350.

In S68, the file-attachment requesting unit 333 causes the monitor 304*a* to display a file selection screen for allowing a user to select a file of the electronic manual 310*a* in which the received emulation program 350 is to be embedded. The file-attachment requesting unit 333 then accepts input of a user operation for selecting a file. More specifically, the file selection screen displays files in a directory structure, for example, by using a file management function of an operating system (OS). The user selects a given file in the directory structure by clicking the file.

In S69, the file-attachment requesting unit 333 activates the document displaying program 310 to request opening of the file of the electronic manual 310*a* selected in S68. In response to the request, the display processing unit 331 of the document displaying program 310 causes the monitor 304*a* to display the selected electronic manual 310*a*.

In S70, the file-attachment requesting unit 333 requests the file-attachment processing unit 313 to embed the newly received emulation program 350 in the currently displayed electronic manual 310*a*. The file-attachment processing unit 313 replaces the emulation program 350 currently embedded in the electronic manual 310*a* by the newly received emulation program 350 under control of the file-attachment requesting unit 333.

More specifically, when the processing in S64-S67 is executed, the file-attachment requesting unit 333 requests the file-attachment processing unit 313 to delete the emulation program 350 embedded in the currently displayed electronic manual 310a. The file-attachment requesting unit 333 then requests the file-attachment processing unit 313 to embed, in the electronic manual 310a, the emulation program 350 having been received in S62 and including the setting table 353 having been updated in S66.

If the processing in S64-S67 is not executed, the file-attachment requesting unit 333 performs a control operation so that data of the emulation program 350 embedded in the electronic manual 310a except for the data of the setting table 353 is updated to data of the newly received emulation program 350.

For example, the file-attachment requesting unit 333 requests the file-attachment processing unit 313 to separate, from the currently displayed electronic manual 310a, the emulation program 350 embedded in the electronic manual 310a. After separation of the emulation program 350, the file-attachment requesting unit 333 extracts the setting table 353 from the separated emulation program 350 and deletes the rest of data. The file-attachment requesting unit 333 then updates the setting table 353 included in the emulation program 350 received in S62 to the data of the setting table 353 extracted from the separated emulation program 350. Thereafter, the file-attachment requesting unit 333 requests the file-attachment processing unit 313 to embed, in the electronic manual 310a, the emulation program 350 including the updated setting table 353.

In S71, the link-image addition requesting unit 334 requests the document-edition processing unit 314 to delete a link image for activating the emulation program 350 from the currently displayed electronic manual 310a. The link-image addition requesting unit 334 then requests the document-edition processing unit 314 to display a link image for activating the newly received emulation program 350 in the currently displayed electronic manual 310a. If the position of the link image displayed in the electronic manual 310a is maintained, the processing in S71 may be skipped.

The emulation program 350 embedded in the electronic manual 310a can be updated in the foregoing processing.

The functions of the above-described apparatuses according to each embodiment can be implemented by computers. In such a case, programs are provided that include processing content of the foregoing functions. The programs are then executed in the computers, whereby the processing functions are implemented in the computers. The programs including the processing content can be recorded on computer-readable recording media. The computer-readable recording media include, for example, a magnetic recording device, an optical disc, a magneto-optical recording medium, and a semiconductor memory.

For example, portable recording media, such as optical discs, storing the programs are sold for distribution of the programs. Additionally, the programs may be stored in a storage device of a server computer and transferred to other computers from the server computer via a network.

Computers for executing the programs store, for example, the programs recorded on the portable recording media or the programs transferred from the server computer in a storage device thereof. The computers then load the programs from the storage device and execute processing in accordance with the programs. The computers may load the programs directly from the portable recording media and execute the processing in accordance with the programs. Additionally, when the computers receive each of the programs from the server computer, the computers may execute processing in accordance with the received program.

What is claimed is:

1. A non-transitory computer-readable recording medium storing a data transmission program, the data transmission program causing a computer to perform a process comprising:
    receiving an editing-program transmission request from a second information processing apparatus displaying an operation manual that includes a procedure for remotely controlling a first information processing apparatus on a display device, the editing-program transmission request being transmitted from the second information processing apparatus in response to a user operation on a program-transmission requesting image displayed within the displayed image of the operation manual;
    transmitting, in response to reception of the editing-program transmission request, an operation-manual editing program for editing the operation manual to the second information processing apparatus, and also transmitting an emulation program for configuring the display device to display a control screen for remotely controlling the first information processing apparatus to the second information processing apparatus; and
    configuring the second information processing apparatus, based on an execution of the operation-manual editing program, to display a program activation image for activating the emulation program in response to a user operation within the displayed operation manual.

2. The non-transitory computer-readable recording medium according to claim 1, wherein the process further comprises:
    configuring the second information processing apparatus, based on the execution of the operation-manual editing program therein, to embed the emulation program in the data of the operation manual displayed on the display device, and to display the program activation image for activating the embedded emulation program within the displayed operation manual.

3. The non-transitory computer-readable recording medium according to claim 2, wherein the process further comprises:
    configuring the second information processing apparatus, based on the execution of the operation-manual editing program therein, to transmit, to the computer, an emulation-program transmission request for requesting the computer to transmit the emulation program;
    configuring the computer to transmit the emulation program to the second information processing apparatus when the computer receives the emulation-program transmission request; and
    configuring the second information processing apparatus, based on the execution of the operation-manual editing program therein, to update the emulation program embedded in the data of the operation manual to the emulation program transmitted from the computer in response to the emulation-program transmission request.

4. The non-transitory computer-readable recording medium according to claim 1, wherein the process further comprises:
    configuring the second information processing apparatus, based on the operation-manual editing program therein, to display a setting screen on the display device, to register setting information input through a user operation on the setting screen in a setting information table of the emulation program, and to terminate execution of the emulation program when the registering of the setting information in the setting information table is completed, with the setting information table being referred to during execution of processing according to information input on the control screen; and configuring the second information processing apparatus, based on the operation-manual editing program to display the program activation image for activating the emulation program within the displayed operation manual, when an execution of the emulation program is completed after inputting of the setting information on the setting screen is completed.

5. The non-transitory computer-readable recording medium according to claim 4, wherein the process further comprises:

configuring the second information processing apparatus, based on an execution of the emulation program therein, to display, on the display device, the setting screen, to register setting information input through a user operation on the setting screen in the setting information table, to display, on the display device, the control screen, to register, in response to input of setting information and registration requesting control information for requesting registration of information through a user operation on the control screen, the input setting information in the setting information table, to read out, in response to input of display requesting control information for requesting displaying of information through a user operation on the control screen, setting information specified by the input display requesting control information from the setting information table, and to include the read out information in the displayed control screen.

6. The non-transitory computer-readable recording medium according to claim 5, wherein the process further comprises:

when the emulation program is executed in the second information processing apparatus in response to a user input operation on the program activation image included in the displayed image of the operation manual, configuring the second information processing apparatus, based on the execution of the emulation program therein, to display a current setting state in the setting screen on the basis of the setting information table, to register, once the setting state changes in response to input of setting information on the setting screen, the input setting information in the setting information table, to display, on the display device, the control screen in response to completion of inputting of the setting information on the setting screen, and to execute processing in accordance with the registration requesting control information and the display requesting control information.

7. The non-transitory computer-readable recording medium according to claim 5, wherein the process further comprises: configuring the second information processing apparatus, based on the emulation program, to function as the control-screen display processing unit to read out, in response to input of the display requesting control information on the setting screen, setting information specified by the display requesting control information from the setting information table;

to incorporate the read out setting information in a display template associated with the display requesting control information to generate response information; and to include the response information in the displayed setting screen.

8. A data transmission apparatus including one or more processors, the apparatus comprising:

a transmission-request receiving unit configured to receive an editing-program transmission request from a second information processing apparatus displaying an operation manual that includes a procedure for remotely controlling a first information processing apparatus on a display device, the editing-program transmission request being transmitted from the second information processing apparatus in response to a user input operation on a program-transmission requesting image included in the displayed image of the operation manual; and a program transmitting unit configured to transmit, once the transmission-request receiving unit receives the editing-program transmission request, an operation-manual editing program for editing the operation manual to the second information processing apparatus, the program transmitting unit also transmitting an emulation program for causing the display device to display a control screen used at the time of remote controlling of the first information processing apparatus to the second information processing apparatus, wherein the second information processing apparatus, based on an execution of the operation-manual editing program therein, is configured to request an edition processing unit included in the second information processing apparatus to edit data of the operation manual so that a program activation image for activating the emulation program in response to a user operation is included in the image of the operation manual displayed on the display device.

9. A method of editing an operation manual comprising:

displaying an operation manual that includes a procedure for remotely controlling a first information processing apparatus on a display device of a second information processing apparatus;

transmitting a program transmission request to a third information processing apparatus from the second information processing apparatus in response to a user input operation on a program-transmission requesting image included in the displayed operation manual;

transmitting, in response to reception of the program transmission request, an operation-manual editing program for editing the operation manual to the second information processing apparatus from the third information processing apparatus and also transmitting an emulation program for causing the display device to display a control screen for remotely controlling the first information processing apparatus; and executing the operation-manual editing program received from the third information processing apparatus in the second information processing apparatus to display a program activation image for activating the received emulation program received from the third information processing apparatus in response to a user operation with the operation manual displayed on the display device.

* * * * *